United States Patent
Bergeal et al.

(10) Patent No.: US 9,707,542 B2
(45) Date of Patent: Jul. 18, 2017

(54) OXIDATION CATALYST FOR A COMPRESSION IGNITION ENGINE

(71) Applicant: Johnson Matthey Public Limited Company, London (GB)

(72) Inventors: David Bergeal, Ware (GB); Andrew Francis Chiffey, Ware (GB); Daniel Hatcher, Royston (GB); James Leeland, Royston (GB); Francois Moreau, Cambridge (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/370,180

(22) PCT Filed: May 16, 2014

(86) PCT No.: PCT/GB2014/051500
§ 371 (c)(1),
(2) Date: Jul. 1, 2014

(87) PCT Pub. No.: WO2014/184569
PCT Pub. Date: Nov. 20, 2014

(65) Prior Publication Data
US 2015/0360213 A1    Dec. 17, 2015

(30) Foreign Application Priority Data

May 17, 2013   (GB) .................................. 1308909.9
Nov. 12, 2013  (GB) .................................. 1319941.9

(51) Int. Cl.

| | | |
|---|---|---|
| B01D 53/94 | (2006.01) | |
| B01J 29/74 | (2006.01) | |
| B01J 23/63 | (2006.01) | |
| B01J 35/00 | (2006.01) | |
| B01J 23/58 | (2006.01) | |
| B01J 29/70 | (2006.01) | |
| B01J 23/42 | (2006.01) | |
| F01N 3/20 | (2006.01) | |
| B01J 35/04 | (2006.01) | |
| B01J 37/02 | (2006.01) | |

(52) U.S. Cl.
CPC ............ *B01J 23/63* (2013.01); *B01D 53/944* (2013.01); *B01J 23/42* (2013.01); *B01J 23/58* (2013.01); *B01J 29/7007* (2013.01); *B01J 29/7415* (2013.01); *B01J 35/0006* (2013.01); *B01J 35/04* (2013.01); *B01J 37/0244* (2013.01); *B01J 37/0246* (2013.01); *F01N 3/20* (2013.01); *B01D 53/9477* (2013.01); *B01D 2255/1021* (2013.01); *B01D 2255/1023* (2013.01); *B01D 2255/2042* (2013.01); *B01D 2255/2065* (2013.01); *B01D 2255/2092* (2013.01); *B01D 2255/30* (2013.01); *B01D 2255/502* (2013.01); *B01D 2255/9022* (2013.01); *B01D 2255/9032* (2013.01); *B01D 2258/012* (2013.01); *B01J 37/0225* (2013.01); *B01J 37/0234* (2013.01); *Y02C 20/10* (2013.01)

(58) Field of Classification Search
None
See application file for complete search history.

(56) References Cited

U.S. PATENT DOCUMENTS

| | | | |
|---|---|---|---|
| 5,045,519 A | | 9/1991 | Meyer et al. |
| 5,473,887 A | | 12/1995 | Takeshima et al. |
| 6,217,837 B1 | | 4/2001 | Narula et al. |
| 6,517,795 B1 | | 2/2003 | Noweck et al. |
| 8,449,852 B1 * | | 5/2013 | Sung ........................ B01J 23/62 423/213.5 |
| 8,652,429 B2 | | 2/2014 | Sumiya et al. |
| 9,005,559 B2 | | 4/2015 | Sumiya et al. |
| 9,011,783 B2 | | 4/2015 | Schuetze et al. |
| 2004/0166036 A1 | | 8/2004 | Chen et al. |
| 2004/0237515 A1 | | 12/2004 | Takaya et al. |
| 2008/0045405 A1 * | | 2/2008 | Beutel ...................... B01J 23/44 502/103 |

(Continued)

FOREIGN PATENT DOCUMENTS

| | | |
|---|---|---|
| DE | 102012218254 A1 | 4/2013 |
| EP | 0766993 A2 | 9/1997 |

(Continued)

OTHER PUBLICATIONS

Cooper, B. Durability of Platinum-Containing Automotive Exhaust Control Catalysts. Improvements in Resistance to Thermal Degradation. Platinum Metals Rev., 1983, 27, (4), pp. 146-155. http://www.technology.matthey.com/article/27/4/146-155/.*

*Primary Examiner* — Walter D Griffin
*Assistant Examiner* — Jelitza Perez
(74) *Attorney, Agent, or Firm* — Gary D. Mangels

(57) ABSTRACT

An oxidation catalyst for treating an exhaust gas from a compression ignition engine, which oxidation catalyst comprises: a first washcoat region comprising platinum (Pt) and a first support material, wherein the first washcoat region is substantially free of a hydrocarbon adsorbent; a second washcoat region comprising platinum (Pt), palladium (Pd) and a second support material, wherein the second washcoat region has a ratio by mass of platinum (Pt) to palladium (Pd) of 4:1 to 1:1; a hydrocarbon adsorbent; and a substrate; wherein the first washcoat region is arranged to contact inlet exhaust gas before the hydrocarbon adsorbent, and the first washcoat region is arranged to contact inlet exhaust gas before the second washcoat region.

32 Claims, No Drawings

(56) References Cited

U.S. PATENT DOCUMENTS

| | | |
|---|---|---|
| 2010/0166629 A1 | 7/2010 | Deeba |
| 2010/0180581 A1* | 7/2010 | Grubert ................ B01D 53/944 60/297 |
| 2010/0180582 A1* | 7/2010 | Mueller-Stach ..... B01D 53/944 60/297 |
| 2010/0257843 A1* | 10/2010 | Hoke ................... B01D 53/945 60/274 |
| 2011/0206584 A1 | 8/2011 | Dobson et al. |
| 2012/0213674 A1 | 8/2012 | Schuetze et al. |
| 2012/0294771 A1 | 11/2012 | Choi |
| 2013/0149221 A1 | 6/2013 | Blakeman et al. |
| 2013/0149222 A1 | 6/2013 | Blakeman et al. |

FOREIGN PATENT DOCUMENTS

| | | |
|---|---|---|
| EP | 1068892 A2 | 1/2001 |
| EP | 0945165 B1 | 10/2003 |
| GB | 2495404 A | 4/2013 |
| WO | 99/47260 A1 | 9/1999 |
| WO | 99/56859 A1 | 11/1999 |
| WO | 2008/132452 A2 | 11/2008 |
| WO | 2011057649 A1 | 5/2011 |

\* cited by examiner

OXIDATION CATALYST FOR A COMPRESSION IGNITION ENGINE

CROSS-REFERENCE TO RELATED APPLICATIONS

This application is the U.S. National Phase application of PCT International Application No. PCT/GB2014/051500, filed on May 16, 2014, and claims priority benefit to Great Britain Patent Application No. 1308909.9 filed on May 17, 2013 and Great Britain Patent Application No. 1319941.9 filed on Nov. 12, 2013, the disclosures of each of which are incorporated herein by reference.

FIELD OF THE INVENTION

The invention relates to an oxidation catalyst for a compression ignition engine, particularly a diesel engine, and its uses. The invention also relates to methods involving the oxidation catalyst. The invention further relates to an exhaust system comprising the oxidation catalyst.

BACKGROUND TO THE INVENTION

Compression ignition engines, such as diesel engines, produce an exhaust emission that generally contains at least four classes of pollutant that are legislated against by inter-governmental organisations throughout the world: carbon monoxide (CO), unburned hydrocarbons (HCs), oxides of nitrogen ($NO_x$) and particulate matter (PM).

Oxidation catalysts comprising platinum group metals (PGMs) have been used to treat carbon monoxide (CO) and hydrocarbons (HCs), including the volatile organic fraction (VOF) of particulate matter (PM), in exhaust emissions produced by diesel engines. Such catalysts treat carbon monoxide (CO) by oxidising it to carbon dioxide ($CO_2$), and treat hydrocarbons (HCs) by oxidising them to water ($H_2O$) and carbon dioxide ($CO_2$). Some platinum group metals, particularly when supported on a refractory oxide, can also promote the oxidation of nitric oxide (NO) to nitrogen dioxide ($NO_2$). It has been found that platinum (Pt) and palladium (Pd) are each able to oxidise carbon monoxide (CO) and hydrocarbons (HCs) in an exhaust gas from a compression ignition engine. Palladium is generally cheaper than platinum, but is less active toward CO and HCs (e.g. Pd has a higher light-off temperature for CO and HCs than Pt). Palladium is also more susceptible to poisoning by sulfur in fuel compared to platinum, and may poison the oxidative activity of platinum toward some HCs.

As emissions standards for permissible emission of pollutants from compression ignition engines, particularly vehicular diesel engines, become progressively tightened, there is a need to provide improved exhaust systems that are able to meet these standards and which are cost-effective. To maximise the overall reduction in pollutants produced by a compression ignition engine it is important that the oxidation catalyst works in conjunction with other emissions control devices that form part of the overall exhaust system.

Shortly after start-up of a compression ignition engine the exhaust gas temperature is relatively low. At such temperatures, the oxidation catalyst may be below its effective operating temperature and a significant proportion of hydrocarbons (HCs) in the exhaust gas can pass through the catalyst without being oxidised. To prevent emission of HCs into the atmosphere under such conditions, oxidation catalysts often include a hydrocarbon adsorbent (HCA), to trap HCs at low temperatures and to release the HCs when the oxidation catalyst has reached its effective operating temperature.

It is conventional to locate the hydrocarbon adsorbent (HCA) in a washcoat region of the oxidation catalyst so that it is brought into contact with the inlet exhaust gas before many of the other components of the catalyst (e.g. the HCA is often included in the front zone and/or the topmost layer of the oxidation catalyst). The HCA can then trap HCs at relatively low temperatures before they come into contact with, and potentially block the active sites of, other components of the catalyst (e.g. the PGM). When the HCs are released at higher temperatures, this arrangement can also facilitate contact of the HCs with the PGM component of the oxidation catalyst. This arrangement is generally used when the HCA is a zeolite. The zeolite is segregated from the PGM to minimise migration of PGM to a surface of the zeolite thereby avoiding a loss of oxidative activity. Segregation of the zeolite from the PGM component can be important when the PGM is palladium because silica in the zeolite can poison palladium.

SUMMARY OF THE INVENTION

The inventors have devised an oxidation catalyst having excellent activity toward oxidising nitric oxide (NO) to nitrogen dioxide ($NO_2$), which also has good CO and HC oxidation activity. Surprisingly, the oxidation catalyst also shows good performance in preventing HC slip (e.g. HC emission to the environment) shortly after start-up of a compression ignition engine when exhaust gas temperatures are relatively low.

The invention provides an oxidation catalyst for treating an exhaust gas from a compression ignition engine, which oxidation catalyst comprises:

a first washcoat region comprising platinum (Pt) and a first support material, wherein the first washcoat region is substantially free of a hydrocarbon adsorbent;

a second washcoat region comprising platinum (Pt), palladium (Pd) and a second support material, wherein the second washcoat region has a ratio by mass of platinum (Pt) to palladium (Pd) of 4:1 to 1:1;

a hydrocarbon adsorbent; and a substrate;

wherein the first washcoat region is arranged to contact inlet exhaust gas before the hydrocarbon adsorbent, and the first washcoat region is arranged to contact inlet exhaust gas before the second washcoat region.

The amount of $NO_2$ in an exhaust gas outlet from an oxidation catalyst can affect the efficiency of a downstream emissions control device in an exhaust system. In general, the proportion of nitrogen dioxide ($NO_2$) to nitric oxide (NO) in an exhaust gas directly produced by a compression ignition engine is below that required for optimal performance of many downstream emissions control devices. Thus, the oxidation of nitric oxide (NO) to nitrogen dioxide ($NO_2$) by the oxidation catalyst is of increasing importance for the overall removal of pollutants by an exhaust system.

The ratio of $NO_2$ to NO in an exhaust gas can affect the active or passive regeneration of an emissions control device that comprises a filtering substrate (e.g. diesel particulate filter (DPF), catalysed soot filter (CSF), selective catalytic reduction filter (SCRF)). $NO_2$ in an exhaust gas can assist in the oxidation of particulate matter (PM) collected by a filtering substrate of the device. The oxidation catalyst of the invention is particularly suitable for use in the active regeneration of an emissions control device comprising a filtering substrate.

The amount of $NO_2$ in an exhaust gas can also affect the performance of a downstream emissions control device for the selective catalytic reduction of oxides of nitrogen ($NO_x$). Selective catalytic reduction (SCR) catalysts and selective catalytic reduction filter (SCRF) catalysts for treating $NO_x$ (e.g. $NO_2$+NO) often require the ratio of $NO_2$ to NO in the inlet gas to be within a specific range for optimum catalytic performance. The optimal $NO_2$ proportion of $NO_x$ typically depends on the type of composition used in the SCR or SCRF catalyst, but the ratio of $NO_2$ to NO in an exhaust gas directly from a compression ignition engine is often too low for optimal performance of the catalyst. The oxidation catalyst of the invention can be used with an SCR or SCRF catalyst, particularly an SCR or SCRF catalyst comprising a copper exchanged zeolite.

The invention provides an exhaust system for a compression ignition engine. The exhaust system comprises an oxidation catalyst of the invention and an emissions control device.

The invention further provides to a vehicle comprising a compression ignition engine and either an oxidation catalyst of the invention or an exhaust system of the invention.

The invention also relates to several uses of the oxidation catalyst and methods involving the oxidation catalyst.

A first method aspect of the invention relates to a method of treating an exhaust gas from a compression ignition engine, which method comprises contacting the exhaust gas with an oxidation catalyst of the invention. The method of treating an exhaust gas from a compression ignition engine is a method of treating (e.g. oxidising) carbon monoxide (CO) and hydrocarbons (HCs) in an exhaust gas from a compression ignition engine.

A second method aspect of the invention relates to a method of modulating the content of $NO_x$ in an exhaust gas from a compression ignition engine for an emissions control device, which method comprises: (a) controlling the $NO_x$ content of an exhaust gas by contacting the exhaust gas with an oxidation catalyst of the invention to produce a treated exhaust gas; and (b) passing the treated exhaust gas to an emissions control device. Additionally, the method may be a method of treating an exhaust gas from a compression ignition engine and modulating the content of $NO_x$ in the exhaust gas for an emissions control device, preferably a method of treating (e.g. oxidising) carbon monoxide (CO) and hydrocarbons (HCs) in an exhaust gas from a compression ignition engine and modulating the content of $NO_x$ in the exhaust gas for an emissions control device.

A first use aspect of the invention relates to the use of an oxidation catalyst of the invention to treat an exhaust gas from a compression ignition engine, optionally in combination with an emissions control device. Generally, the oxidation catalyst is used to treat (e.g. oxidise) carbon monoxide (CO) and hydrocarbons (HCs) in an exhaust gas from a compression ignition engine, optionally in combination with an emissions control device.

In a second use aspect, the invention relates to the use of an oxidation catalyst of the invention to modulate the content of $NO_x$ in an exhaust gas from a compression ignition engine for an emissions control device.

A third use aspect relates to the use of an oxidation catalyst of the invention in the regeneration of an emissions control device having a filtering substrate.

DETAILED DESCRIPTION OF THE INVENTION

The oxidation catalyst of the invention has a first washcoat region arranged (e.g. on the substrate) to contact inlet exhaust gas before both (a) the hydrocarbon adsorbent and (b) the second washcoat region. It has unexpectedly been found that this arrangement results in an oxidation catalyst that has excellent NO oxidation activity, whilst also showing good oxidation activity toward CO and HCs and good performance in preventing slip of HCs. When an exhaust gas has been passed through the oxidation catalyst of the invention, the molar ratio of $NO_2$ to NO in the outlet exhaust gas (i.e. from the oxidation catalyst) is significantly greater than the molar ratio of $NO_2$ to NO in the inlet exhaust gas (i.e. into the oxidation catalyst).

The first washcoat region (this may be referred to as the NO oxidation region below) in the oxidation catalyst of the invention is formulated and arranged on the substrate to provide optimal NO oxidation performance. The first washcoat region comprises platinum (Pt), which can oxidise NO to $NO_2$. It has surprisingly been found that (i) the inclusion of a hydrocarbon adsorbent in the NO oxidation region and/or (ii) arranging the hydrocarbon adsorbent to contact inlet exhaust gas before the NO oxidation region can be detrimental to NO oxidation performance.

The location of the hydrocarbon adsorbent in relation to the NO oxidation region can affect NO oxidation performance. When a hydrocarbon adsorbent is present in an NO oxidation region, then the resulting localised presence of HCs in conjunction with $NO_x$ may result in the occurrence of selective catalytic reduction to form nitrogen (as in a lean $NO_x$ catalyst), which reduces the amount of $NO_2$ that is generated.

The first washcoat region is substantially free of a hydrocarbon adsorbent, such as a zeolite. More preferably, the first washcoat region does not comprise a hydrocarbon adsorbent, such as a zeolite. The exclusion of a hydrocarbon adsorbent (HCA) from the first washcoat region may be detrimental to the CO oxidative performance of that region. It is thought that when the HCA is present in that washcoat region it "filters out" HCs from the exhaust gas, which reduces the competition with CO to react at the catalytically active sites.

The first washcoat region typically comprises platinum disposed or supported on the first support material (e.g. first platinum support material). Platinum may be dispersed on the first support material (e.g. first platinum support material) and/or impregnated into the first support material (e.g. first platinum support material).

The platinum is generally disposed directly onto or is directly supported by the first support material (e.g. first platinum support material). Thus, for example, there is no intervening support material between the platinum and the first support material. It is preferred that the platinum is in direct contact with the first support material (e.g. first platinum support material).

Typically, the first support material comprises, or consists essentially of, a refractory metal oxide. The refractory metal oxide is typically selected from the group consisting of alumina, silica, titania, zirconia, ceria and mixed or composite oxides of two or more thereof. For example, the refractory metal oxide may be selected from the group consisting of alumina, silica, titania, zirconia, ceria, silica-alumina, titania-alumina, zirconia-alumina, ceria-alumina, titania-silica, zirconia-silica, zirconia-titania and ceria-zirconia. It is preferred that the refractory metal oxide is selected from alumina, silica and mixed or composite oxides thereof. More preferably, the refractory metal oxide is selected from alumina, silica-alumina and a mixture of alumina and ceria. Even more preferably, the refractory metal oxide is selected from alumina and silica-alumina. Refractory metal oxides suitable for use as a catalytic component of an oxidation catalyst for a compression ignition engine are well known in the art.

In general, when the refractory metal oxide is a mixed or composite oxide of alumina (e.g. silica-alumina or a mixture of alumina and ceria), then preferably the mixed or composite oxide of alumina comprises at least 50 to 99% by weight of alumina, more preferably 70 to 95% by weight of alumina, even more preferably 75 to 90% by weight of alumina.

When the first support material comprises ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and to 45% by weight zirconia), even more preferably 45 to 75% by weight of ceria and 25 to 55% by weight zirconia.

It is generally preferred (e.g. first support material or second support material) that the ceria or the ceria-zirconia has a high surface area. Typically, the ceria or the ceria-zirconia has a surface area of 30 to 300 m$^2$/g, preferably 60 to 200 m$^2$/g. The surface area is measured using conventional nitrogen physisorption techniques.

The first support material (i.e. refractory metal oxide) may optionally be doped (e.g. with a dopant).

The inclusion of a dopant can thermally stabilise the support material (e.g. the first support material and/or the second support material). It is to be understood that any reference to "doped" in this context refers to a material where the bulk or host lattice of the refractory metal oxide (e.g. ceria or ceria-zirconia) is substitution doped or interstitially doped with a dopant. In some instances, small amounts of the dopant may be present at a surface of the refractory metal oxide (e.g. ceria or ceria-zirconia). However, most of the dopant will generally be present in the body of the refractory metal oxide (e.g. ceria or ceria-zirconia).

In general, when the first support material (e.g. ceria or ceria-zirconia) is doped, then the total amount of dopant is 0.1 to 5% by weight (i.e. % by weight of the ceria or the ceria-zirconia). It is preferred that the total amount of dopant is 0.25 to 2.5% by weight, more preferably 0.5 to 1.5% by weight (e.g. about 1% by weight).

The first support material (e.g. ceria) may be doped with one or more dopant selected from the group consisting of zirconium (Zr), titanium (Ti), silicon (Si), yttrium (Y), lanthanum (La), praseodymium (Pr), samarium (Sm), neodymium (Nd) and an oxide thereof. For example, ceria-zirconia may be doped with one or more dopant selected from the group consisting of titanium (Ti), silicon (Si), yttrium (Y), lanthanum (La), praseodymium (Pr), samarium (Sm), neodymium (Nd) and an oxide thereof.

In general, it is preferred that the first support material comprises, or consists essentially of, alumina, silica-alumina, alumina doped with a dopant, alumina doped with a heteroatom component or a refractory metal oxide comprising ceria. More preferably, the first support material comprises, or consists essentially of, alumina, silica-alumina or with a heteroatom component.

It may be preferred that the refractory metal oxide is alumina. The alumina can be α-Al$_2$O$_3$, β-Al$_2$O$_3$, or γ-Al$_2$O$_3$. Preferably the alumina comprises, or consists essentially of, γ-Al$_2$O$_3$.

Typically, the first washcoat region comprises an amount of platinum (Pt) of 0.2 to 15% by weight, preferably 0.5 to 10% by weight, more preferably 1 to 9% by weight (e.g. 1.2 to 8.5%, such as 1.5 to 8% by weight), such as 1.5 to 7% by weight (e.g. 2 to 7%, such as 4 to 6% by weight). The % by weight in this context is with reference to the amount of the first support material (e.g. first platinum support material).

The first washcoat region typically comprises platinum (Pt) in an amount of 5 to 300 g ft$^{-3}$, more preferably 10 to 250 g ft$^{-3}$, such as 20 to 200 g ft$^{-3}$, still more preferably 25 to 175 g ft$^{-3}$, and even more preferably 35 to 150 g ft$^{-3}$ (e.g. 50 to 125 g ft$^{-3}$). For example, the first washcoat region may comprise a total amount of platinum (Pt) of 5 to 150 g ft$^{-3}$, more preferably 7.5 to 125 g ft$^{-3}$, such as 10 to 110 g ft$^{-3}$, still more preferably 25 to 100 g ft$^{-3}$, and even more preferably 30 to 75 g ft$^{-3}$ (e.g. 40 to 125 g ft$^{-3}$).

In the first washcoat region, platinum may be the only platinum group metal (PGM). More preferably, platinum may be the only catalytically active metal. Thus, for example, the first washcoat region does not include a catalytically active metal, such as a catalytically active metal selected from the group consisting of palladium (Pd), gold (Au), ruthenium (Ru), rhodium (Rh), iridium (Ir), and silver (Ag).

The first washcoat region may consist essentially of platinum (Pt), a first support material and optionally a promoter.

Alternatively, the first washcoat region may further comprise palladium (Pd). Thus, the first washcoat region may comprise, or consist essentially of, platinum (Pt), palladium (Pd) and a first support material. It is preferred that the first washcoat region has a ratio by mass of platinum (Pt) to palladium (Pd) of >4:1, such as 25:1 to 4.1:1 (e.g. 15:1 to 4.5:1 or 20:1 to 5:1). In particular, the first washcoat region has a ratio by mass of platinum (Pt) to palladium (Pd) of 10:1 to 5:1 (e.g. 10:1 to 7.5:1), more preferably 8.5:1 to 6:1, such as 7.5:1 to 7:1. For example, the first washcoat region has a ratio by mass of platinum (Pt) to palladium (Pd) of 10:1 to 6:1, more preferably 8:1 to 7:1. It is advantageous for NO oxidation activity for platinum to be present in the first washcoat region in a significant excess compared to palladium.

The first washcoat region may comprise a ratio of the molar amount of platinum (Pt) to the molar amount of palladium (Pd) of 20:1 to 2.5:1 (e.g. 7.5:1 to 2.5:1); such as 10:1 to 5:1.

When the first washcoat region comprises palladium (Pd), the palladium (Pd) may be disposed or supported on the first support material (e.g. first palladium support material). Thus, palladium (Pd) can be dispersed on the first support material (e.g. first palladium support material) and/or impregnated into the first support material (e.g. first palladium support material).

The palladium is generally disposed directly onto or is directly supported by the first support material (e.g. first palladium support material). Thus, for example, there is no intervening support material between the palladium and the first support material. It is preferred that the palladium is in direct contact with the first support material (e.g. first palladium support material), particularly when the first support material or the first palladium support material comprises, or consists essentially of, cerium oxide (i.e. ceria).

In the first washcoat region, the platinum and the palladium can be disposed or supported on the same first support material. Thus, the first washcoat region may comprise a single support material, which is the first support material.

When the first washcoat region comprises platinum and palladium, then the first washcoat region may comprise a platinum-palladium alloy, preferably a bimetallic platinum-palladium alloy. It is preferred that the first washcoat region comprises a platinum-palladium alloy when the platinum and palladium are disposed or support on the same first support material.

Alternatively, platinum can be disposed or supported on a first platinum support material and palladium can be disposed or supported on a first palladium support material, wherein the first platinum support material and the first palladium support material are different. Thus, the first platinum support material and the first palladium support material can have different compositions. More preferably, the first platinum support material and the first palladium support material comprise, or consist essentially of, different refractory metal oxides.

The first platinum support material and the first palladium support material may each independently be a first support material as described above.

Typically, the first palladium support material comprises cerium oxide. It is preferred that the first palladium support material comprises, or consists essentially of, ceria ($CeO_2$) or ceria-zirconia ($CeO_2$—$ZrO_2$), wherein the ceria or ceria-zirconia is optionally doped. The first platinum support material typically comprises alumina. It is preferred that the first platinum support material comprises, or consists essentially of, alumina (e.g. $\gamma$-$Al_2O_3$) or silica-alumina, wherein the alumina or silica-alumina is optionally doped.

The first washcoat region may comprise an amount of palladium (Pd) of 0.2 to 15% by weight (e.g. 11.5 to 14% by weight or 12 to 15% by weight), preferably 0.5 to 10% by weight, more preferably 1 to 9% by weight (e.g. 1.5 to 8% by weight), such as 2 to 7% by weight (e.g. 4 to 6% by weight). It is preferred that the first washcoat region may comprise an amount of palladium (Pd) of 0.25 to 4% by weight (e.g. 0.4 to 3.5% by weight), preferably 0.5 to 3.0% by weight (e.g. 0.75 to 2.5% by weight or 1 to 1.75% by weight), and even more preferably 0.75 to 1.5% by weight. The % by weight in this context is with reference to the amount of the first support material (e.g. first palladium support material).

The first washcoat region may comprise an amount of palladium less than 2% by weight. For example, the first washcoat region may comprise an amount of palladium of 0.25 to 1.9% by weight, more preferably 0.4 to 1.8% by weight, such as 0.5 to 1.75% by weight, and even more preferably 0.75 to 1.5% by weight.

Typically, the first washcoat region comprises palladium (Pd) in an amount of 1 to 175 g $ft^{-3}$. For example, the first washcoat region may comprise palladium (Pd) in an amount of 5 to 120 g $ft^{-3}$, preferably 10 to 100 g $ft^{-3}$, such as 15 to 85 g $ft^{-3}$ (e.g. 25 to 85 g $ft^{-3}$), still more preferably 25 to 80 g $ft^{-3}$ (e.g. 35 to 80 g $ft^{-3}$), and even more preferably 30 to 75 g $ft^{-3}$ (e.g. 50 to 75 g $ft^{-3}$). It is preferred that the first washcoat region comprises palladium (Pd) in a total amount of 2 to 150 g $ft^{-3}$, more preferably 5 to 125 g $ft^{-3}$, such as to 110 g $ft^{-3}$, still more preferably 20 to 100 g $ft^{-3}$, and even more preferably 25 to 75 g $ft^{-3}$ (e.g. 30 to 75 g $ft^{-3}$).

Typically, the first washcoat region comprises an amount of the first support material (e.g. the total amount of first platinum support material and first palladium support material) of 0.1 to 4.5 g $in^{-3}$ (e.g. 0.25 to 4.2 g $in^{-3}$), preferably 0.3 to 3.8 g $in^{-3}$, still more preferably 0.5 to 3.0 g $in^{-3}$, and even more preferably 0.6 to 2.5 g $in^{-3}$ (e.g. 0.75 to 2.3 g $in^{-3}$). For example, the first washcoat region preferably comprises an amount of the first support material of 0.5 to 3.5 g $in^{-3}$, more preferably 1 to 3.25 g $in^{-3}$, still more preferably 1.1 to 3.0 g $in^{-3}$ (e.g. 1.25 to 2.75 g $in^{-3}$ or 1.5 to 2.75 g $in^{-3}$), and even more preferably 1.25 to 2.5 g $in^{-3}$, or an amount of 0.1 to 3.5 g $in^{-3}$, preferably 0.2 to 2.5 g $in^{-3}$, still more preferably 0.3 to 2.0 g $in^{-3}$, and even more preferably 0.5 to 1.75 g $in^{-3}$ (e.g. 0.75 to 1.5 g $in^{-3}$).

The first washcoat region may further comprise a promoter. The promoter may be selected from the group consisting of an alkali metal component, an alkali earth metal component and a combination thereof. It is preferred that the promoter is an alkaline earth metal component.

The alkali metal component typically comprises lithium (Li), sodium (Na), potassium (K) or a combination of two or more thereof. It is preferred that the alkali metal component comprises sodium (Na) or potassium (K), more preferably the alkali metal component comprises potassium (K).

The alkaline earth metal component typically comprises magnesium (Mg), calcium (Ca), strontium (Sr), barium (Ba) or a combination of two or more thereof. It is preferred that the alkaline earth metal component comprises calcium (Ca), strontium (Sr), or barium (Ba), more preferably strontium (Sr) or barium (Ba), and most preferably the alkaline earth metal component comprises barium (Ba).

It is preferred that the first washcoat region comprises a promoter, particularly an alkaline earth metal component, when platinum is the only platinum group metal in the first washcoat region, more preferably platinum is the only catalytically active metal.

Typically, the first washcoat region comprise an amount of promoter, particularly the alkaline earth metal component, of 0.07 to 5 mol $ft^{-3}$, particularly 0.1 to 4.0 mol $ft^{-3}$, more particularly 0.2 to 3.0 mol $ft^{-3}$ (e.g. 0.25 to 1.0 mol $ft^{-3}$), such as 0.3 to 2.25 mol $ft^{-3}$, especially 0.35 to 2.0 mol $ft^{-3}$, preferably 0.4 to 1.8 mol $ft^{-3}$, even more preferably 0.5 to 1.5 mol $ft^{-3}$.

When the first washcoat region comprises a promoter, particularly an alkaline earth metal component, the first support material may comprise, or consist essentially of, a modified alumina incorporating a heteroatom component. The modified alumina incorporating a heteroatom component generally comprises, or consists essentially of, an alumina doped with a heteroatom component, an alkaline earth metal aluminate or a mixture thereof. It is preferred that the modified alumina incorporating a heteroatom component comprises, or consists essentially of, an alumina doped with a heteroatom component or an alkaline earth metal aluminate.

The alumina doped with a heteroatom component may be selected from the group consisting of alumina doped with silica, alumina doped with magnesium oxide, alumina doped with barium, alumina doped with barium oxide, alumina doped with lanthanum oxide and alumina doped with ceria. It is preferred that the alumina doped with a heteroatom component is selected from the group consisting of alumina doped with silica, alumina doped with lanthanum oxide, alumina doped with ceria and alumina doped with magnesium oxide. More preferably, the alumina doped with a heteroatom component is selected from the group consisting of alumina doped with silica and alumina doped with magnesium oxide. Even more preferably, the alumina doped with a heteroatom component is alumina doped with silica. Alumina doped with a heteroatom component can be prepared using methods known in the art or, for example, by a method described in U.S. Pat. No. 5,045,519.

Typically, the alumina doped with a heteroatom component comprises 0.5 to 45% by weight of the heteroatom component, preferably 1 to 40% by weight of the heteroatom component, more preferably 1.5 to 30% by weight of the heteroatom component, particularly 2.5 to 25% by weight of the heteroatom component. When the alumina doped with a heteroatom component comprises, or consists essentially of, alumina doped with silica, then the alumina is doped with silica in an amount of 0.5 to 45% by weight, preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight. When the alumina doped with a heteroatom component comprises, or consists essentially of, alumina doped with magnesium oxide, then the alumina is doped with magnesium in an amount as defined above or an amount of 5 to 30% by weight, preferably 10 to 25% by weight.

Typically, the alkaline earth metal aluminate is magnesium aluminate ($MgAl_2O_4$), calcium aluminate ($CaAl_2O_4$), strontium aluminate ($SrAl_2O_4$), or barium aluminate ($BaAl_2O_4$), or a mixture of two or more thereof. Preferably, the alkaline earth metal aluminate is magnesium aluminate ($MgAl_2O_4$). These compounds can be prepared using conventional methods well known in the art or, for example, by using a method described in EP 0945165, U.S. Pat. Nos. 6,217,837 or 6,517,795.

Generally, when the heteroatom component comprises, or consists essentially of, an alkaline earth metal, then preferably the alkaline earth metal component is different to the heteroatom component. When a support material (e.g. first support material or second support material) comprises an alkaline earth metal aluminate, then the alkaline earth metal of the alkaline earth metal aluminate is different to the alkaline earth metal component.

Alternatively, when the first washcoat region comprises a promoter, particularly an alkaline earth metal component, the first washcoat region or first support material may not comprise a modified alumina incorporating a heteroatom component.

The first washcoat region comprises, or consists essentially of, platinum (Pt), palladium (Pd), a first support material and optionally a promoter. The first support material may include a first platinum support material and a first palladium support material. Alternatively, the first support material may be the only support material present in the first washcoat region. More preferably, the first washcoat region comprises, or consists essentially of, platinum, palladium and a first support material, wherein the first support material comprises, or consists essentially of, alumina.

The oxidation catalyst of the invention comprises a hydrocarbon adsorbent, which is arranged on the substrate to contact inlet gas after the first washcoat region.

The second washcoat region may comprise the hydrocarbon adsorbent and/or a third washcoat region may comprise the hydrocarbon adsorbent. It is preferred that only one of the second washcoat region and the third washcoat region comprises the hydrocarbon adsorbent. When the oxidation catalyst comprises a third washcoat region, it is preferred that the third washcoat region comprises the hydrocarbon adsorbent, and the second washcoat region is substantially free of a hydrocarbon adsorbent, such as a zeolite.

Typically, the second support material comprises, or consists essentially of, a refractory metal oxide. The refractory metal oxide is typically selected from the group consisting of alumina, silica, titania, zirconia, ceria and mixed or composite oxides of two or more thereof. For example, the refractory metal oxide may be selected from the group consisting of alumina, silica, titania, zirconia, ceria, silica-alumina, titania-alumina, zirconia-alumina, ceria-alumina, titania-silica, zirconia-silica, zirconia-titania and ceria-zirconia. It is preferred that the refractory metal oxide is selected from alumina, silica and mixed or composite oxides thereof. Even more preferably, the refractory metal oxide is selected from alumina, silica-alumina and a mixture of alumina and ceria.

When the second support material comprises ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

The second support material (i.e. refractory metal oxide) may optionally be doped (e.g. with a dopant).

When the second support material (e.g. ceria or ceria-zirconia) is doped, then the total amount of dopant is 0.1 to 5% by weight (i.e. % by weight of the ceria or the ceria-zirconia). It is preferred that the total amount of dopant is 0.25 to 2.5% by weight, more preferably 0.5 to 1.5% by weight (e.g. about 1% by weight).

The second support material (e.g. ceria) may be doped with one or more dopant selected from the group consisting of zirconium (Zr), titanium (Ti), silicon (Si), yttrium (Y), lanthanum (La), praseodymium (Pr), samarium (Sm), neodymium (Nd) and an oxide thereof. For example, ceria-zirconia may be doped with one or more dopant selected from the group consisting of titanium (Ti), silicon (Si), yttrium (Y), lanthanum (La), praseodymium (Pr), samarium (Sm), neodymium (Nd) and an oxide thereof.

In general, it is preferred that the second support material comprises, or consists essentially of, alumina, silica-alumina, alumina doped with a dopant, alumina doped with a heteroatom component or a refractory metal oxide comprising ceria. More preferably, the second support material comprises, or consists essentially of, alumina, silica-alumina or with a heteroatom component.

It may be preferred that the refractory metal oxide is alumina. The alumina can be $\alpha\text{-}Al_2O_3$, $\beta\text{-}Al_2O_3$, or $\gamma\text{-}Al_2O_3$. Preferably the alumina comprises, or consists essentially of, $\gamma\text{-}Al_2O_3$.

The second washcoat region generally comprises platinum disposed or supported on the second support material (e.g. second platinum support material). Platinum may be dispersed on the second support material (e.g. second platinum support material) and/or impregnated into the second support material (e.g. second platinum support material). The platinum may be disposed directly onto or is directly supported by the second support material (e.g. second platinum support material). Thus, for example, there is no intervening support material between the platinum and the second support material (e.g. second platinum support material). It is preferred that the platinum is in direct contact with the second support material (e.g. second platinum support material).

The second washcoat region typically comprises palladium (Pd) disposed or supported on the second support material (e.g. second palladium support material). Thus, palladium (Pd) can be dispersed on the second support material (e.g. second palladium support material) and/or impregnated into the second support material (e.g. second palladium support material).

The palladium is generally disposed directly onto or is directly supported by the second support material (e.g. second palladium support material). Thus, for example, there is no intervening support material between the palladium and the second support material. It is preferred that the palladium is in direct contact with the second support material (e.g. second palladium support material), particularly when the second support material or the second palladium support material comprises, or consists essentially of, cerium oxide (i.e. ceria).

When the second washcoat region comprises a hydrocarbon adsorbent, such as a zeolite, it is preferred that the platinum and palladium are not disposed or supported on the hydrocarbon adsorbent.

In the second washcoat region, the platinum and the palladium can be disposed or supported on the same second support material. Thus, the second washcoat region may comprise a single support material, which is the second support material.

The second washcoat region may comprise a platinum-palladium alloy, preferably a bimetallic platinum-palladium alloy. It is preferred that the second washcoat region comprises a platinum-palladium alloy when the platinum and palladium are disposed or support on the same second support material.

Alternatively, platinum can be disposed or supported on a second platinum support material and palladium can be disposed or supported on a second palladium support material, wherein the second platinum support material and the second palladium support material are different. Thus, the second platinum support material and the second palladium support material can have different compositions. More preferably, the second platinum support material and the second palladium support material comprise, or consist essentially of, different refractory metal oxides.

The second platinum support material and the second palladium support material may each independently be a second support material as described above.

Typically, the second palladium support material comprises cerium oxide. It is preferred that the second palladium support material comprises, or consists essentially of, ceria ($CeO_2$) or ceria-zirconia ($CeO_2$—$ZrO_2$), wherein the ceria or ceria-zirconia is optionally doped.

The second platinum support material typically comprises alumina. It is preferred that the second platinum support material comprises, or consists essentially of, alumina (e.g. $\gamma$-$Al_2O_3$) or silica-alumina, wherein the alumina or silica-alumina is optionally doped.

The second washcoat region has a ratio by mass of platinum to palladium of 4:1 to 1:1. It is preferred that the second washcoat region has a ratio by mass of platinum (Pt) to palladium (Pd) of 3.9:1 to 1.1:1, such as 3.75:1 to 1.25:1, particularly 3.5:1 to 1.5:1, more preferably 3.25:1 to 1.75:1 (e.g. 3:1 to 2:1). For example, the second washcoat region may have a ratio by mass of platinum (Pt) to palladium (Pd) of 2:1 to 1.25:1, such as 1.75:1 to 1.5:1. The second washcoat region is formulated to provide excellent CO and HC oxidation activity. It is intended that the second washcoat region compensates for any detriment in the CO oxidation performance of the first washcoat region.

The second washcoat region may comprise a ratio of the molar amount of platinum (Pt) to the molar amount of palladium of 2:1 to 1.1:1.

Typically, the second washcoat region comprises an amount of platinum (Pt) of 0.2 to 15% by weight, preferably 0.5 to 10% by weight, more preferably 1 to 9% by weight (e.g. 1.5 to 8% by weight), such as 2 to 7% by weight (e.g. 4 to 6% by weight). The % by weight in this context is with reference to the amount of the second support material (e.g. second platinum support material).

The second washcoat region typically comprises platinum (Pt) in an amount of 2 to 300 g $ft^{-3}$ (e.g. 5 to 300 g $ft^{-3}$), preferably 8 to 250 g $ft^{-3}$ (e.g. 10 to 250 g $ft^{-3}$), such as 10 to 200 g $ft^{-3}$ (e.g. 20 to 200 g $ft^{-3}$), more preferably 20 to 175 g $ft^{-3}$ (e.g. 25 to 175 g $ft^{-3}$), and even more preferably 25 to 150 g $ft^{-3}$ (e.g. 35 to 150 g $ft^{-3}$ or 50 to 125 g $ft^{-3}$). Depending on the application, the second washcoat region may comprise a total amount of platinum (Pt) of 2 to 150 g $ft^{-3}$, more preferably 5 to 125 g $ft^{-3}$, such as 10 to 110 g $ft^{-3}$, still more preferably 20 to 100 g $ft^{-3}$ (e.g. 25 to 100 g $ft^{-3}$), and even more preferably 25 to 75 g $ft^{-3}$ (e.g. 30 to 75 g $ft^{-3}$). Alternatively, the second washcoat region may comprise platinum (Pt) in an amount of 50 to 300 g $ft^{-3}$, preferably 100 to 275 g $ft^{-3}$, such as 150 to 250 g $ft^{-3}$, more preferably 175 to 200 g $ft^{-3}$.

Generally, the second washcoat region comprises an amount of palladium (Pd) of 0.2 to 15% by weight (e.g. 11.5 to 14% by weight or 12 to 15% by weight), preferably 0.5 to 10% by weight, more preferably 1 to 9% by weight (e.g. 1.5 to 8% by weight), such as 2 to 7% by weight (e.g. 4 to 6% by weight). For example, the second washcoat region may comprise an amount of palladium (Pd) of 0.25 to 4% by weight (e.g. 0.4 to 3.5% by weight), preferably 0.5 to 3.0% by weight (e.g. 0.75 to 2.5% by weight or 1 to 1.75% by weight), and even more preferably 0.75 to 1.5% by weight. The % by weight in this context is with reference to the amount of the second support material (e.g. second palladium support material).

The second washcoat region may comprise an amount of palladium less than 2% by weight. It is preferred that the second washcoat region comprises an amount of palladium of 0.25 to 1.9% by weight, more preferably 0.4 to 1.8% by weight, such as 0.5 to 1.75% by weight, and even more preferably 0.75 to 1.5% by weight.

Typically, the second washcoat region comprises palladium (Pd) in an amount of 2 to 300 g $ft^{-3}$ (e.g. 5 to 300 g $ft^{-3}$), preferably 8 to 250 g $ft^{-3}$ (e.g. 10 to 250 g $ft^{-3}$), such as 10 to 200 g $ft^{-3}$ (e.g. 20 to 200 g $ft^{-3}$), more preferably 20 to 175 g $ft^{-3}$, (e.g. 25 to 175 g $ft^{-3}$), and even more preferably 25 to 150 g $ft^{-3}$ (e.g. (e.g. 35 to 150 g $ft^{-3}$, such as 50 to 125 g $ft^{-3}$). It is preferred that the second washcoat region comprises palladium (Pd) in a total amount of 2 to 150 g $ft^{-3}$, more preferably 5 to 125 g $ft^{-3}$, such as 10 to 110 g $ft^{-3}$, still more preferably 20 to 100 g $ft^{-3}$, and even more preferably 25 to 75 g $ft^{-3}$ (e.g. 30 to 75 g $ft^{-3}$). For example, the second washcoat region may comprise palladium (Pd) in an amount of 5 to 120 g $ft^{-3}$, preferably 10 to 100 g $ft^{-3}$, such as 25 to 85 g $ft^{-3}$, still more preferably 35 to 80 g $ft^{-3}$, and even more preferably 50 to 75 g $ft^{-3}$.

In the second washcoat region, the mass of platinum (Pt) is preferably greater than the mass of palladium (Pd).

Typically, the second washcoat region comprises an amount of the second support material (e.g. the total amount of second platinum support material and second palladium support material) of 0.1 to 4.5 g $in^{-3}$ (e.g. 0.25 to 4.2 g $in^{-3}$), preferably 0.3 to 3.8 g $in^{-3}$, still more preferably 0.5 to 3.0 g $in^{-3}$, and even more preferably 0.6 to 2.5 g $in^{-3}$ (e.g. 0.75 to 2.3 g $in^{-3}$). For example, the second washcoat region may comprise an amount of the second support material of 0.5 to 3.5 g $in^{-3}$, more preferably 1 to 3.25 g $in^{-3}$, still more preferably 1.1 to 3.0 g in$^{-3}$ (e.g. 1.25 to 2.75 g in$^{-3}$ or 1.5 to 2.75 g in$^{-3}$), and even more preferably 1.25 to 2.5 g in$^{-3}$ or an amount of 0.1 to 3.5 g in$^{-3}$, preferably 0.2 to 2.5 g in$^{-3}$, still more preferably 0.3 to 2.0 g in$^{-3}$, and even more preferably 0.5 to 1.75 g in$^{-3}$ (e.g. 0.75 to 1.5 g in$^{-3}$).

When the second washcoat region comprises a hydrocarbon adsorbent, the total amount of hydrocarbon adsorbent is 0.05 to 3.00 g in$^{-3}$, particularly 0.10 to 2.00 g in$^{-3}$, more particularly 0.2 to 0.8 g in$^{-3}$. For example, the total amount of hydrocarbon adsorbent may be 0.8 to 1.75 g in$^{-3}$, such as 1.0 to 1.5 g in$^{-3}$.

When the second washcoat region comprises the hydrocarbon adsorbent, the oxidation catalyst may have only two washcoat regions, the first washcoat region and the second washcoat region.

In general, the second washcoat region may further comprise a promoter. The promoter may be selected from the group consisting of an alkali metal component, an alkaline earth metal component and a combination thereof. It is preferred that the promoter is an alkaline earth metal component. The alkali metal component and the alkaline earth metal component is each described above.

The second washcoat region may comprise a promoter, particularly an alkaline earth metal component, when the third washcoat region comprises the hydrocarbon adsorbent, such as when the second washcoat region is substantially free of a hydrocarbon adsorbent.

Typically, the second washcoat region comprises an amount of the promoter, particularly the alkaline earth metal component, of 0.07 to 3.75 mol ft$^{-3}$, particularly 0.1 to 3.0 mol ft$^{-3}$, more particularly 0.2 to 2.5 mol ft$^{-3}$ (e.g. 0.25 to 1.0 mol ft$^{-3}$), such as 0.3 to 2.25 mol ft$^{-3}$, especially 0. 0.35 to 1.85 mol ft$^{-3}$, preferably 0.4 to 1.5 mol ft$^{-3}$, even more preferably 0.5 to 1.25 mol ft$^{-3}$.

When the second washcoat region comprises a promoter, particularly an alkaline earth metal component, the second support material may comprise, or consist essentially of, a modified alumina incorporating a heteroatom component as described above.

Alternatively, when the second washcoat region comprises a promoter, particularly an alkaline earth metal component, the second washcoat region or second support material may not comprise a modified alumina incorporating a heteroatom component.

Typically, the second washcoat region consists essentially of platinum (Pt), palladium (Pd), the second support material, a hydrocarbon adsorbent and optionally a promoter, especially when the oxidation catalyst has only two washcoat regions. The second support material may include a second platinum support material and a second palladium support material. Alternatively, the second support material may be the only support material present in the second washcoat region. More preferably, the second washcoat region consists essentially of platinum, palladium, the second support material and a zeolite.

When the third washcoat region comprises the hydrocarbon adsorbent, the second washcoat region may consist essentially of platinum (Pt), palladium (Pd), the second support material and optionally a promoter. The second support material may include a second platinum support material and a second palladium support material. Alternatively, the second support material may be the only support material present in the second washcoat region. More preferably, the second washcoat region comprises, or consists essentially of, platinum, palladium and a second support material, optionally wherein the second support material comprises, or consists essentially of, alumina.

A third washcoat region may comprise the hydrocarbon adsorbent. The third washcoat region typically comprises an amount of hydrocarbon adsorbent of 0.05 to 3.00 g in$^{-3}$, particularly 0.10 to 2.00 g in$^{-3}$, more particularly 0.2 to 0.8 g in$^{-3}$. For example, the total amount of hydrocarbon adsorbent may be 0.8 to 1.75 g in$^{-3}$, such as 1.0 to 1.5 g in$^{-3}$.

When the oxidation catalyst comprises a third washcoat region, the primary function of the third washcoat region is to provide a hydrocarbon adsorbent for storage and release of HCs. It is preferred that the third washcoat region is substantially free of, or does not comprise, platinum and/or palladium. More preferably, the third washcoat is substantially free of, or does not comprise a platinum group metal (PGM).

Typically, the third washcoat region consists essentially of a hydrocarbon adsorbent.

In general, the hydrocarbon adsorbent may be selected from a zeolite, active charcoal, porous graphite and a combination of two or more thereof. It is preferred that the hydrocarbon adsorbent is a zeolite.

When the hydrocarbon adsorbent is a zeolite, then preferably the zeolite is a medium pore zeolite (e.g. a zeolite having a maximum ring size of eight tetrahedral atoms) or a large pore zeolite (e.g. a zeolite having a maximum ring size of ten tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

The second washcoat region may comprise 20% or more of the total weight of platinum in the oxidation catalyst, preferably 35% or more, more preferably 50% or more (e.g. 70% or more, such as 90% or more). The presence of a substantial quantity of platinum in the second washcoat region may be advantageous for CO and/or HC oxidation activity.

The second washcoat region may comprise 100% or less of the total weight of palladium in the oxidation catalyst, preferably 90% or less, more preferably 75% or less.

It is preferred that the second washcoat region comprises at least 50%, more preferably at least 60%, of the total weight of palladium of the oxidation catalyst.

In general, each support material (e.g. the first support material and/or the second support material) is in particulate form. Each support material may have a d$_{90}$ particle size of ≤20 μm (as determined by conventional laser diffraction techniques). The particle size distribution of the support material is selected to aid adhesion to the substrate. The particles are generally obtained by milling.

Typically, the oxidation catalyst comprises a total amount (by mass) of platinum and palladium of 1.0 to 10.0 g. The total amount of platinum and palladium that is used depends on, amongst other things, the size of the substrate and the intended application of the oxidation catalyst.

Generally, the total amount of platinum in the first washcoat region and the second washcoat region to the total amount of palladium in the first washcoat region and the second washcoat region have a ratio (by mass) of 20:1 to 1:1 (e.g. 20:1 to 2:1). Thus, the ratio by mass of platinum to palladium contained in both the first washcoat region and the second washcoat region can be 20:1 to 1:1. Preferably, the ratio is 10:1 to 2:1 (e.g. 10:1 to 2.5:1, such as 8:1 to 3:1), more preferably the ratio is 7.5:1 to 3:1, such as 5:1 to 4:1.

In the oxidation catalyst of the invention, the ratio (by mass) of platinum (Pt) to palladium (Pd) is typically 20:1 to 1.1:1 (e.g. 15:1 to 1.2:1), preferably the ratio is 10:1 to 1.3:1 (e.g. 9:1 to 1.4:1), more preferably 8:1 to 1.5:1, even more preferably 7.5:1 to 1.75:1, such as 6:1 to 2:1, and still more preferably 5.5:1 to 2.5:1 (e.g. 5:1 to 3:1). It is preferred that the ratio (by mass) of platinum (Pt) to palladium (Pd) is typically >3:1 (e.g. >4:1), such as 20:1 to 4:1 (e.g. 20:1 to 4.5:1), particularly 10:1 to 5:1.

The oxidation catalyst of the invention generally comprises a total amount of first support material and second support material of 0.2 to 8 g in$^{-3}$, preferably 0.4 to 7 g in$^{-3}$ (e.g. 0.5 to 6 g in$^{-3}$), more preferably 0.75 to 5 g in$^{-3}$ (e.g. 0.8 to 4 g in$^{-3}$), still more preferably 1.0 to 3.5 g in$^{-3}$ (e.g. 1.0 to 3 g in$^{-3}$).

Typically, the ratio of the total mass of promoter, particularly the alkaline earth metal component, to the total mass of the platinum group metal (PGM) component is 0.25:1 to 20:1 (e.g. 0.3:1 to 20:1). It is preferred that the ratio of the total mass of the promoter, particularly the alkaline earth metal component, to the total mass of the platinum group metal (PGM) component is 0.5:1 to 17:1, more preferably 0.7:1 to 15:1, particularly 1:1 to 10:1, still more preferably 1.5:1 to 7.5:1, and even more preferably 2:1 to 5:1. When platinum (Pt) is present, then preferably the total mass of the promoter, particularly the alkaline earth component, is greater than the total mass of the platinum (Pt).

The first washcoat region and/or second washcoat region may each independently further comprise an oxygen storage material. Such materials are well-known in the art. When the first washcoat region comprises an oxygen storage material, then the oxygen storage material is present in a total amount of 0.1 to 20% (e.g. 0.1 to 10%, such as 0.25 to 5%, 0.25 to 2.5%, or 0.5 to 1%) of the total amount of the first support material. When the second washcoat region comprises an oxygen storage material, then the oxygen storage material is present in a total amount of 0.1 to 20% (e.g. 0.1 to 10%, such as 0.25 to 5%, 0.25 to 2.5%, or 0.5 to 1%) of the total amount of the second support material.

The oxygen storage material may be selected from ceria (CeO$_2$) and ceria-zirconia (CeO$_2$—ZrO$_2$), such as a ceria-zirconia solid solution. The oxygen storage material preferably does not comprise ceria (CeO$_2$), zirconia (ZrO$_2$), lanthana (La$_2$O$_3$) and neodymia (Nd$_2$O$_3$).

When first washcoat region comprises an oxygen storage material and the oxygen storage material is selected from ceria and ceria-zirconia, then preferably the oxygen storage material is either (a) ceria when the first support material comprises, or consists essentially of, ceria-zirconia, or (b) ceria-zirconia when the first support material comprises, or consists essentially of, ceria. When the second washcoat region comprises an oxygen storage material and the oxygen storage material is selected from ceria and ceria-zirconia, then preferably the oxygen storage material is either (a) ceria when the second support material comprises, or consists essentially of, ceria-zirconia, or (b) ceria-zirconia when the second support material comprises, or consists essentially of, ceria.

It is preferred that only one of the first washcoat region and the second washcoat region comprises an oxygen storage material (i.e. there is not an oxygen storage material in both the first and second washcoat regions). More preferably, only the second washcoat region comprises an oxygen storage material.

Methods of making washcoat regions of different arrangements are known in the art (see for example WO 99/47260 by the present Applicant). For the avoidance of doubt, the first washcoat region, the second washcoat region and the optional third washcoat region are disposed or supported on the same substrate.

In the oxidation catalyst of the invention, the first washcoat region is arranged on the substrate to contact inlet exhaust gas before the hydrocarbon adsorbent, and the first washcoat region is arranged on the substrate to contact inlet exhaust gas before the second washcoat region. The second washcoat region may be arranged on the substrate to contact inlet gas before, after or concurrently with the hydrocarbon adsorbent. It is preferred that hydrocarbon adsorbent and the second washcoat region are arranged on the substrate such that hydrocarbon stored by the hydrocarbon adsorbent is brought into contact with the second washcoat region when desorbed or released from the hydrocarbon adsorbent.

When the second washcoat region comprises the hydrocarbon adsorbent, then the first washcoat region is arranged on the substrate to contact inlet exhaust gas before the hydrocarbon adsorbent by being arranged on the substrate to contact inlet exhaust gas before the second washcoat region comprising the hydrocarbon adsorbent. As part of the second washcoat region, the hydrocarbon adsorbent is brought into contact with the other components of the second washcoat region at the same time. An advantage of locating the hydrocarbon adsorbent in the second washcoat region is that when the HC is released it is immediately brought into contact with Pt and Pd present in the same washcoat region.

When the oxidation catalyst has a third washcoat region that comprises the hydrocarbon adsorbent, then the first washcoat region is arranged on the substrate to contact inlet exhaust gas before the third washcoat region comprising the hydrocarbon adsorbent. The second washcoat region may be arranged on the substrate to contact inlet gas before, after or at the same time as the third washcoat region. It is preferred that the third washcoat region and the second washcoat region are arranged on the substrate such that desorbed or released HC from the hydrocarbon adsorbent is brought into contact with the second washcoat region.

In general, it is preferred that the second washcoat region and/or the third washcoat region is each disposed or supported downstream of the first washcoat region.

Generally, the first washcoat region may be disposed directly on to the substrate (i.e. the first washcoat region is in contact with a surface of the substrate). The second washcoat region may be (a) disposed directly on to the substrate (i.e. the second washcoat region is in contact with a surface of the substrate), and/or (b) in contact with the first washcoat region. Alternatively, the second washcoat region may be disposed directly on to the third washcoat region.

When the second washcoat region is disposed directly on to the substrate, then the second washcoat region may be in contact with the first washcoat region or the first washcoat region and the second washcoat region may be separated (e.g. by an intervening washcoat region, such as the third washcoat region, or by a gap).

Typically, the second washcoat region may be disposed directly on to the substrate (i.e. the second washcoat region is in contact with a surface of the substrate). The first washcoat region may be (i) disposed or supported on the second washcoat region, (ii) disposed directly on to the substrate (i.e. the first washcoat region is in contact with a surface of the substrate), and/or (iii) in contact with the second washcoat region. Alternatively, the first washcoat region may be disposed directly on to the third washcoat region.

When the first washcoat region is disposed or supported on the second washcoat region, the first washcoat region may be disposed directly on to the second washcoat region (i.e. the first washcoat region is in contact with a surface of the second washcoat region) or the first washcoat region may be disposed directly on to the third washcoat region, where the additional washcoat region is disposed (e.g. directly or otherwise) or supported on the second washcoat region. When the first washcoat region is disposed directly on to the substrate, then the first washcoat region may be in contact with the second washcoat region or the second washcoat region and the first washcoat region may be separated (e.g. by an intervening washcoat region, such as the third washcoat region, or by a gap).

In general, it is possible that both the first washcoat region and the second washcoat are not directly disposed on the substrate (i.e. neither the first washcoat region nor the second washcoat region is in contact with a surface of the substrate). Thus, at least one of the first washcoat region and the second washcoat region is disposed or supported on the third washcoat region.

Some oxidation catalysts of the invention are described below where the first washcoat region and the second washcoat region have "zoned" arrangements. For the avoidance of doubt, these arrangements are general features of the oxidation catalyst of the invention and may be combined with the arrangements of the first and second washcoat regions described above.

In a first oxidation catalyst arrangement, the first washcoat region is a first washcoat zone disposed or supported at or near an inlet end of the substrate. The second washcoat region may be disposed or supported downstream of the first washcoat zone. Preferably, the second washcoat region is a second washcoat zone. More preferably, the second washcoat zone is disposed or supported downstream of the first washcoat zone.

In a second oxidation catalyst arrangement, the second washcoat region is a second washcoat zone disposed or supported at an outlet end of the substrate. The first washcoat region may be disposed or supported upstream of the second washcoat zone. Preferably, the first washcoat region is a first washcoat zone. More preferably, the first washcoat zone is disposed or supported upstream of the second washcoat zone.

The first washcoat zone may adjoin the second washcoat zone. Preferably, the first washcoat zone is contact with the second washcoat zone. When the first washcoat zone adjoins the second washcoat zone or the first washcoat zone is in contact with the second washcoat zone, the first washcoat zone and the second washcoat zone may be disposed or supported on the substrate as a layer (e.g. a single layer). Thus, a layer may be formed on the substrate when the first and second washcoat zones adjoin or are in contact with one another.

The first washcoat zone may be separate from the second washcoat zone. Thus, there may be an intervening additional washcoat zone or region (e.g. a third washcoat zone or region) between the first washcoat zone and the second washcoat zone, and/or there may be a gap (e.g. a space) between the first washcoat zone and the second washcoat zone.

The first washcoat zone may overlap the second washcoat zone. Thus, an end portion of the first washcoat zone may be disposed or supported on the second washcoat zone. The first washcoat zone may completely or partly overlap the second washcoat zone. When the first washcoat zone completely overlaps the second washcoat zone, then typically a surface of the second washcoat zone (normally a surface in the longitudinal plane of the catalyst, i.e. the plane that is perpendicular to the plane of the inlet and outlet ends of the substrate) is completely covered by the first washcoat zone.

Alternatively, the second washcoat zone may overlap the first washcoat zone. Thus, an end portion of the second washcoat zone may be disposed or supported on the first washcoat zone. The second washcoat zone may partly overlap the first washcoat zone.

It is preferred that the first washcoat zone and the second washcoat zone do not substantially overlap.

When there is a third washcoat region, in the first and second oxidation catalyst arrangements, the third washcoat region may be a third washcoat zone disposed downstream of the first washcoat zone. The third washcoat zone may disposed upstream of the second washcoat zone. Alternatively, the third washcoat zone may be disposed downstream of the second zone.

The third washcoat zone may overlap the first washcoat zone and/or the third washcoat zone may overlap the second washcoat one. Thus, an end portion of the third washcoat zone may be disposed or supported on the first washcoat zone and/or the third washcoat zone. The first washcoat zone and/or second washcoat zone may each completely or partly overlap the third washcoat zone.

It is preferred that the third washcoat zone does not substantially overlap with the first washcoat zone and/or the second washcoat zone.

When there is a third washcoat region, in the first and second oxidation catalyst arrangements, the third washcoat region may be a third washcoat layer disposed or supported on the substrate, preferably disposed directly on to the substrate. The first washcoat zone and/or the second washcoat zone may be disposed on the third washcoat layer.

Typically, the first washcoat zone has a length of 10 to 90% of the length of the substrate (e.g. 10 to 45%), preferably 15 to 75% of the length of the substrate (e.g. 15 to 40%), more preferably 20 to 70% (e.g. 20 to 65%, such as 25 to 45%) of the length of the substrate, still more preferably 25 to 65% (e.g. 25 to 50%).

The second washcoat zone typically has a length of 10 to 90% of the length of the substrate (e.g. 10 to 45%), preferably 15 to 75% of the length of the substrate (e.g. 15 to 40%), more preferably 20 to 70% (e.g. 20 to 65%, such as 25 to 45%) of the length of the substrate, still more preferably 25 to 65% (e.g. 25 to 50%).

The third washcoat zone may have a length of 10 to 90% of the length of the substrate (e.g. 10 to 45%), preferably 15 to 75% of the length of the substrate (e.g. 15 to 40%), more preferably 20 to 70% (e.g. 20 to 65%, such as 25 to 45%) of the length of the substrate, still more preferably 25 to 65% (e.g. 25 to 50%).

Oxidation catalysts of the invention are described below where the first washcoat region and the second washcoat region have "layered" arrangements. For the avoidance of doubt, these arrangements are general features of the oxidation catalyst of the invention and may be combined with any of the arrangements of the first and second washcoat regions described above.

The first washcoat region may be a first washcoat layer and the second washcoat region may be a second washcoat layer. The first washcoat layer and the second washcoat layer may have different lengths, or the first washcoat layer and the second washcoat layer may have about the same length. Generally, the length of the first washcoat layer and the length of the second washcoat layer is each substantially uniform.

When there is a third washcoat region, then the third washcoat region may be a third washcoat layer. The length of the third washcoat layer is generally substantially uniform.

Typically, at least one of the first washcoat layer and the second washcoat layer extends for substantially an entire length of the substrate, particularly the entire length of the channels of a substrate monolith. More preferably, the first washcoat layer and the second washcoat layer each extend for substantially an entire length of the substrate.

When there is a third washcoat layer, the third washcoat layer typically extends for substantially an entire length of the substrate, particularly the entire length of the channels of a substrate monolith.

In a third oxidation catalyst arrangement, the first washcoat layer is disposed or supported on the second washcoat layer, preferably the first washcoat layer is disposed directly on to the second washcoat layer (i.e. the first washcoat layer is in contact with a surface of the second washcoat layer).

When the first washcoat layer is disposed directly on to the second washcoat layer, it is preferred that the entire length of the first washcoat layer is disposed or supported on the second washcoat layer. Thus, the length of the first washcoat layer is less than or equal to the length of the second washcoat layer. More preferably, an end of the first washcoat layer does not extend beyond an end of the second washcoat layer (i.e. the ends or boundaries of the first washcoat layer are within the ends or boundaries of the second washcoat layer).

In the third oxidation catalyst arrangement, the second washcoat layer may be disposed disposed directly on to the substrate (i.e. the second washcoat layer is in contact with a surface of the substrate) and/or the second washcoat layer may be disposed directly on to the third washcoat region, particularly a third washcoat zone or layer, preferably a third washcoat layer.

The second washcoat layer may only be disposed directly on to the substrate (i.e. the second washcoat layer is in contact with a surface of the substrate). Alternatively, the second washcoat layer may only be disposed directly on to the third washcoat region, particularly a third washcoat zone or layer, preferably a third washcoat layer.

When the second washcoat layer is disposed directly on to a third washcoat region, then the third washcoat region may be disposed directly on to the substrate.

In a fourth oxidation catalyst arrangement, the first washcoat layer is disposed or supported on a third washcoat layer, preferably the first washcoat layer is disposed directly on to the third washcoat layer. Preferably, the entire length of the first washcoat layer is disposed or supported on the third washcoat layer. Thus, the length of the first washcoat layer is less than or equal to the length of the third washcoat layer. More preferably, an end of the first washcoat layer does not extend beyond an end of the third washcoat layer (i.e. the ends or boundaries of the first washcoat layer are within the ends or boundaries of the third washcoat layer).

In the fourth oxidation catalyst arrangement, the third washcoat layer may be disposed disposed directly on to the substrate (i.e. the third washcoat layer is in contact with a surface of the substrate) and/or the third washcoat layer may be disposed directly on to the second washcoat region, particularly a second washcoat zone or layer, preferably a second washcoat layer.

The third washcoat layer may only be disposed directly on to the substrate (i.e. the third washcoat layer is in contact with a surface of the substrate). Alternatively, the third washcoat layer may only be disposed directly on to the second washcoat region, particularly a second washcoat zone or layer, preferably a second washcoat layer.

When the third washcoat layer is disposed directly on to a second washcoat region, then the second washcoat region may be disposed directly on to the substrate.

When the first washcoat region is a first washcoat layer, it is preferred that the first washcoat layer is the topmost washcoat region/layer (i.e. there is no other washcoat region or washcoat layer disposed on the first washcoat layer). When the first washcoat region is a first washcoat zone, it is preferred that the first washcoat zone is the front most washcoat region/zone (i.e. there is no other washcoat region or washcoat zone disposed upstream of the first washcoat zone).

There is several preferred oxidation catalyst embodiments, each of which may include one or more of the features described above.

In a first oxidation catalyst embodiment, the first washcoat region comprises platinum (Pt), palladium (Pd) and a first support material comprising cerium oxide.

In a second oxidation catalyst embodiment, the second washcoat region comprises platinum (Pt), palladium (Pd) and a second support material comprising cerium oxide.

In a third oxidation catalyst embodiment, the first washcoat region comprises platinum (Pt), palladium (Pd) and a first support material comprising cerium oxide, and the second washcoat region comprises platinum (Pt), palladium (Pd) and a second support material comprising cerium oxide.

In a fourth oxidation catalyst embodiment, the first support material does not comprise cerium oxide and/or the second support material does not comprise cerium oxide. For example, the first washcoat region may not comprise ceria-zirconia or ceria-zirconia-alumina.

In the first or third oxidation catalyst embodiments, it is preferred the first washcoat region comprises a ratio by weight of palladium (Pd) to cerium (Ce) of 1:1000 to 1:10, preferably 1:500 to 1:15, more preferably 1:200 to 1:20.

In the first or third oxidation catalyst embodiments, the first support material typically comprises, or consists essentially of, ceria ($CeO_2$) or ceria-zirconia ($CeO_2$—$ZrO_2$), wherein the ceria or ceria-zirconia is optionally doped. The ceria-zirconia may be a ceria-zirconia solid solution.

In the first or third oxidation catalyst embodiments, it is preferred that the first support material comprises, or consists essentially of, ceria ($CeO_2$) or ceria-zirconia ($CeO_2$—$ZrO_2$), which is not doped.

In the first or third oxidation catalyst embodiments, it is preferred that the first support material consists essentially of ceria. More preferably, the first support material consists essentially of ceria in a microporous form or a mesoporous form.

In the second or third oxidation catalyst embodiments, it is preferred the second washcoat region comprises a ratio by weight of palladium (Pd) to cerium (Ce) of 1:1000 to 1:10, preferably 1:500 to 1:15, more preferably 1:200 to 1:20.

In the second or third oxidation catalyst embodiments, the second support material typically comprises, or consists essentially of, ceria ($CeO_2$) or ceria-zirconia ($CeO_2$—$ZrO_2$), wherein the ceria or ceria-zirconia is optionally doped. The ceria-zirconia may be a ceria-zirconia solid solution.

In the second or third oxidation catalyst embodiments, it is preferred that the second support material comprises, or consists essentially of, ceria ($CeO_2$) or ceria-zirconia ($CeO_2$—$ZrO_2$), which is not doped.

In the second or third oxidation catalyst embodiments, it is preferred that the second support material consists essentially of ceria. More preferably, the second support material consists essentially of ceria in a microporous form or a mesoporous form.

In general, it is preferred that the first washcoat region is substantially free of or does not comprise a $NO_x$ adsorber material for a lean $NO_x$ trap (LNT). $NO_x$ adsorber materials for a lean $NO_x$ trap (LNT) typically comprise an alkali metal (e.g. Li, Na, K), an alkaline earth metal (e.g. Mg, Ca, Sr, Ba) and/or a rare earth metal.

The first washcoat region typically is substantially free of or does not comprise an alkali metal (e.g. Li, Na, K), an alkaline earth metal (e.g. Mg, Ca, Sr, Ba) and/or a rare earth metal, particularly a rare earth metal selected from the group consisting of lanthanum (La), yttrium (Y) and a combination thereof. The general exclusion relating to a rare earth metal does not apply to the ceria or ceria-zirconia that is part of the first support material.

Generally, the first washcoat region is substantially free of or does not comprise rhodium (Rh).

It is preferred in general that the first washcoat region does not comprise rhodium (Rh), a hydrocarbon adsorbent, an alkali metal (e.g. Li, Na, K), an alkaline earth metal (e.g. Mg, Ca, Sr, Ba) and a rare earth metal, particularly a rare earth metal selected from the group consisting of lanthanum (La), yttrium (Y) and a combination thereof.

Typically the second washcoat region, or the oxidation catalyst itself, is substantially free of or does not comprise a $NO_x$ adsorber material for a lean $NO_x$ trap (LNT). $NO_x$ adsorber materials for a lean $NO_x$ trap (LNT) typically comprise an alkali metal (e.g. Li, Na, K), an alkaline earth metal (e.g. Mg, Ca, Sr, Ba) and/or a rare earth metal. Cerium and cerium oxide are not considered to be a $NO_x$ adsorber material in this context.

The second washcoat region typically is substantially free of or does not comprise an alkali metal (e.g. Li, Na, K), an alkaline earth metal (e.g. Mg, Ca, Sr, Ba) and/or a rare earth metal, particularly a rare earth metal selected from the group consisting of lanthanum (La), yttrium (Y) and a combination thereof.

Generally, the second washcoat region or the oxidation catalyst of the invention is substantially free of or does not comprise rhodium (Rh).

It is preferred in general that the second washcoat region does not comprise rhodium (Rh), a hydrocarbon adsorbent, an alkali metal (e.g. Li, Na, K), an alkaline earth metal (e.g. Mg, Ca, Sr, Ba) and a rare earth metal, particularly a rare earth metal selected from the group consisting of lanthanum (La), yttrium (Y) and a combination thereof.

Substrates for supporting oxidation catalysts for treating the exhaust gas of a compression ignition engine are well known in the art. The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art. The substrate monolith may be a flow-through monolith or a filtering monolith.

A flow-through monolith typically comprises a honeycomb monolith (e.g. a metal or ceramic honeycomb monolith) having a plurality of channels extending therethrough, which channels are open at both ends. When the substrate is a flow-through monolith, then the oxidation catalyst of the invention is typically a diesel oxidation catalyst (DOC) or is for use as a diesel oxidation catalyst (DOC).

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a filtering monolith, then the oxidation catalyst of the invention is typically a catalysed soot filter (CSF) or is for use as a catalysed soot filter (CSF).

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

In general, the oxidation catalyst of the invention is for use as a diesel oxidation catalyst (DOC) or a catalysed soot filter (CSF). In practice, catalyst formulations employed in DOCs and CSFs are similar. Generally, a principle difference between a DOC and a CSF is the substrate onto which the catalyst formulation is coated and the total amount of platinum, palladium and any other catalytically active metals that are coated onto the substrate.

The invention also provides an exhaust system comprising the oxidation catalyst and an emissions control device. In general, the emissions control device is separate to the oxidation catalyst (e.g. the emissions control device has a separate substrate to the substrate of the oxidation catalyst), and preferably the oxidation catalyst is upstream of the emissions control device.

The emissions control device may be selected from a diesel particulate filter (DPF), a $NO_x$ adsorber catalyst (NAC), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, and combinations of two or more thereof. Emissions control devices represented by the terms diesel particulate filters (DPFs), $NO_x$ adsorber catalysts (NACs), lean $NO_x$ catalysts (LNCs), selective catalytic reduction (SCR) catalysts, diesel oxidation catalyst (DOCs), catalysed soot filters (CSFs) and selective catalytic reduction filter (SCRF™) catalysts are all well known in the art.

Examples of emissions control devices for use with the oxidation catalyst of the invention or for inclusion in the exhaust system of the invention are provided below.

A diesel particulate filter is an emissions control device having a filtering substrate. The diesel particulate filter preferably comprises a substrate, wherein the substrate is a filtering monolith or a flow-through monolith as defined above, preferably a filtering monolith. The substrate may be coated with a catalyst formulation.

The catalyst formulation of the diesel particulate filter may be suitable for oxidising (i) particulate matter (PM) and/or (ii) carbon monoxide (CO) and hydrocarbons (HCs). When the catalyst formulation is suitable for oxidising PM, then the resulting emissions control device is known as a catalysed soot filter (CSF). A catalysed soot filter (CSF) is also an emissions control device having a filtering substrate. Typically, the catalyst formulation of a CSF comprises platinum and/or palladium.

The catalyst formulation of the diesel particulate filter may be a $NO_x$ adsorber composition. When the catalyst formulation is a $NO_x$ adsorber composition, the emissions control device is an example of a $NO_x$ adsorber catalyst (NAC) (e.g. a $NO_x$ adsorber composition on a filter). Emissions control devices where the catalyst formulation is a $NO_x$ adsorber composition have been described (see, for example, EP 0766993). $NO_x$ adsorber compositions are well known in the art (see, for example, EP 0766993 and U.S. Pat. No. 5,473,887). $NO_x$ adsorber compositions are designed to adsorb $NO_x$ from lean exhaust gas (lambda >1) and to desorb the $NO_x$ when the oxygen concentration in the exhaust gas is decreased. Desorbed $NO_x$ may then be reduced to $N_2$ with a suitable reductant (e.g. engine fuel) and promoted by a catalyst component, such as rhodium, of the $NO_x$ adsorber composition itself or located downstream of the $NO_x$ adsorber composition.

In general, $NO_x$ adsorber catalysts [also referred to as lean $NO_x$ traps (LNTs), lean $NO_x$ trap catalysts, De $NO_x$ trap (DNT) catalysts, $NO_x$ storage catalysts, or $NO_x$ storage/reduction (NSR) catalysts] known as comprise coated on honeycomb flow-through monolith substrates are typically arranged in layered arrangements. However, multiple layers applied on a filter substrate can create backpressure problems. It is highly preferable, therefore, if the $NO_x$ absorber catalyst for use in the present invention is a "single layer" $NO_x$ absorber catalyst. Particularly preferred "single layer" $NO_x$ absorber catalysts comprise a first component of rhodium supported on a ceria-zirconia mixed oxide or an optionally stabilised alumina (e.g. stabilised with silica or lanthana or another rare earth element) in combination with second components which support platinum and/or palladium. The second components comprise platinum and/or palladium supported on an alumina-based high surface area support and a particulate "bulk" ceria ($CeO_2$) component, i.e. not a soluble ceria supported on a particulate support, but "bulk" ceria capable of supporting the Pt and/or Pd as such. The particulate ceria comprises a $NO_x$ absorber component and supports an alkaline earth metal and/or an alkali metal, preferably barium, in addition to the platinum and/or palladium. The alumina-based high surface area support can be magnesium aluminate e.g. $MgAl_2O_4$, for example.

The preferred "single layer" NAC composition comprises a mixture of the rhodium and platinum and/or palladium support components. These components can be prepared separately, i.e. pre-formed prior to combining them in a mixture, or rhodium, platinum and palladium salts and the supports and other components can be combined and the rhodium, platinum and palladium components hydrolysed preferentially to deposit onto the desired support.

Generally, a $NO_x$ adsorber composition comprises an alkali metal component, an alkaline earth metal component or a rare earth metal component or a combination of two or more components thereof, wherein the rare earth metal component comprises lanthanum or yttrium. It is preferred that the alkali metal component comprises potassium or sodium, more preferably potassium. It is preferred that the alkaline earth metal component comprises barium or strontium, more preferably barium.

The $NO_x$ adsorber composition may further comprise a support material and/or a catalytic metal component. The support material may be selected from alumina, ceria, titania, zirconia and mixtures thereof. The catalytic metal component may comprise a metal selected from platinum (Pt), palladium (Pd), rhodium (Rh) and combinations of two or more thereof.

Lean $NO_x$ catalysts (LNCs) are well known in the art. Preferred lean $NO_x$ catalysts (LNC) comprises either (a) platinum (Pt) supported on alumina or (b) a copper exchanged zeolite, particularly copper exchanged ZSM-5.

SCR catalysts are also well known in the art. When the exhaust system of the invention comprises an SCR catalyst, then the exhaust system may further comprise an injector for injecting a nitrogenous reductant, such as ammonia, or an ammonia precursor, such as urea or ammonium formate, preferably urea, into exhaust gas downstream of the catalyst for oxidising carbon monoxide (CO) and hydrocarbons (HCs) and upstream of the SCR catalyst. Such injector is fluidly linked to a source of such nitrogenous reductant precursor, e.g. a tank thereof, and valve-controlled dosing of the precursor into the exhaust stream is regulated by suitably programmed engine management means and closed loop or open loop feedback provided by sensors monitoring relevant exhaust gas composition. Ammonia can also be generated by heating ammonium carbamate (a solid) and the ammonia generated can be injected into the exhaust gas.

Alternatively or in addition to the injector, ammonia can be generated in situ e.g. during rich regeneration of a NAC disposed upstream of the filter or by contacting a DOC disposed upstream of the filter with engine-derived rich exhaust gas. Thus, the exhaust system may further comprise an engine management means for enriching the exhaust gas with hydrocarbons. The SCR catalyst can then use the hydrocarbons as a reductant to reduce $NO_x$.

SCR catalysts for use in the present invention promote the reactions selectively $4NH_3 + 4NO + O_2 \rightarrow 4N_2 + 6H_2O$ (i.e. 1:1 $NH_3$:NO); $4NH_3 + 2NO + 2NO_2 \rightarrow 4N_2 + 6H_2O$ (i.e. 1:1 $NH_3$:$NO_x$; and $8NH_3 + 6NO_2 \rightarrow 7N_2 + 12H_2O$ (i.e. 4:3 $NH_3$:$NO_x$) in preference to undesirable, non-selective side-reactions such as $2NH_3 + 2NO_2 \rightarrow N_2O + 3H_2O + N_2$.

The SCR catalyst may comprise a metal selected from the group consisting of at least one of Cu, Hf, La, Au, In, V, lanthanides and Group VIII transition metals, such as Fe, which metal is supported on a refractory oxide or molecular sieve. Particularly preferred metals are Ce, Fe and Cu and combinations of any two or more thereof.

The refractory oxide may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide, e.g. $V_2O_5/WO_3/TiO_2$, $WO_x/CeZrO_2$, $WO_x/ZrO_2$ or $Fe/WO_x/ZrO_2$.

It is particularly preferred when an SCR catalyst or washcoat thereof comprises at least one molecular sieve, such as an aluminosilicate zeolite or a SAPO. The at least one molecular sieve can be a small, a medium or a large pore molecular sieve, for example. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts—see for example WO 2008/132452.

Preferred molecular sieves with application as SCR catalysts in the present invention are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

At its most basic, an ammonia slip catalyst (ASC) can be an oxidation catalyst for oxidising ammonia which slips past an upstream SCR or SCRF catalyst unreacted. The desired reaction (simplified) can be represented by $4NO+4NH_3+O_2 \rightarrow 4N_2+6H_2O$. Ammonia is a strong smelling compound and potential irritant to animal mucosal surfaces, e.g. eyes and respiratory pathways, and so its emission to atmosphere should be limited so far as possible. Possible ammonia slip catalysts include relatively low loaded platinum group metals, preferably including Pt e.g. 1-15 g/ft$^{-3}$, on a suitable relatively high surface area oxide support, e.g. alumina coated on a suitable substrate monolith.

In a particularly preferred arrangement, however, the platinum group metal and the support material (e.g. comprising a modified alumina incorporating a heteroatom component) is disposed on a substrate (i.e. a substrate monolith) in a first layer below an upper, second layer overlying the first layer. The second layer is a SCR catalyst, selected from any of those mentioned hereinabove, particularly molecular sieves containing transition metals, such as Cu or Fe. A particularly preferred ASC in the layered arrangement comprises CuCHA in the second or upper layer.

When the substrate of the SCR catalyst is a filtering monolith, then the catalyst is an SCRF™ catalyst. An SCRF™ catalyst is an emissions control device having a filtering substrate.

Generally, SCR catalysts are unable to reduce substantial amounts of $NO_x$ in an exhaust gas shortly after start-up of a compression ignition engine because the exhaust gas temperature (and hence the temperature of the catalyst) is too low. Lean $NO_x$ traps have, for example, been employed upstream of SCR catalysts, so that $NO_x$ can be stored until the SCR catalyst becomes active at higher exhaust gas temperatures. However, lean $NO_x$ traps are often unable to adequately store $NO_x$ when there is a large mass flow of exhaust gas (e.g. when the engine is operated at a high speed cycle).

The $NO_x$ content of an exhaust gas directly from a compression ignition engine depends on a number of factors, such as the mode of operation of the engine, the temperature of the engine and the speed at which the engine is run. However, it is common for an engine to produce an exhaust gas where $NO_x$ content is 85 to 95% (by volume) nitric oxide (NO) and 5 to 15% (by volume) nitrogen dioxide ($NO_2$). The $NO:NO_2$ ratio is typically from 19:1 to 17:3. However, it is generally favourable for the $NO_2$ content to be much higher for selective catalytic reduction (SCR) catalysts to reduce $NO_x$ or to regenerate an emissions control device having a filtering substrate by burning off particulate matter.

In a first exhaust system embodiment, the exhaust system comprises the oxidation catalyst of the invention, preferably as a DOC, and a selective catalytic reduction (SCR) catalyst. This embodiment also relates to the use of the oxidation catalyst for treating an exhaust gas from a compression ignition engine in combination with a selective catalytic reduction (SCR) catalyst, preferably wherein the oxidation catalyst is, or is for use as, a diesel oxidation catalyst. The oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst.

A second exhaust system embodiment comprises the oxidation catalyst of the invention, preferably as a DOC, and a selective catalytic reduction filter (SCRF™) catalyst. This embodiment also relates to the use of the oxidation catalyst for treating an exhaust gas from a compression ignition engine in combination with a selective catalytic reduction filter (SCRF™) catalyst, preferably wherein the oxidation catalyst is, or is for use as, a diesel oxidation catalyst. The oxidation catalyst of the invention is typically followed by (e.g. is upstream of) the selective catalytic reduction filter (SCRF™) catalyst. A nitrogenous reductant injector may be arranged between the oxidation catalyst and the selective catalytic reduction filter (SCRF™) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF™) catalyst.

In a third exhaust system embodiment, the exhaust system comprises the oxidation catalyst of the invention, preferably as a DOC, and either a diesel particulate filter (DPF) or a catalysed soot filter (CSF). This embodiment also relates to the use of the oxidation catalyst for treating an exhaust gas from a compression ignition engine in combination with a diesel particulate filter or a catalysed soot filter, preferably wherein the oxidation catalyst is, or is for use as, a diesel oxidation catalyst. The oxidation catalyst is typically followed by (e.g. is upstream of) the diesel particulate filter or the catalysed soot filter (CSF). Thus, for example, an outlet of the oxidation catalyst is connected to an inlet of the diesel particulate filter or the catalysed soot filter.

In a fourth exhaust system embodiment, the exhaust system comprises a diesel oxidation catalyst and the oxidation catalyst of the invention, preferably as a catalysed soot filter (CSF). The embodiment further relates to the use of the oxidation catalyst for treating an exhaust gas from a compression ignition engine in combination with a diesel oxidation catalyst (DOC), preferably wherein the oxidation catalyst is, or is for use as, a catalysed soot filter. Typically, the diesel oxidation catalyst (DOC) is followed by (e.g. is upstream of) the oxidation catalyst of the invention. Thus, an outlet of the diesel oxidation catalyst is connected to an inlet of the oxidation catalyst of the invention.

A fifth exhaust system embodiment relates to an exhaust system comprising the oxidation catalyst of the invention, preferably as a DOC, a diesel particulate filter or a catalysed soot filter (CSF), and a selective catalytic reduction (SCR) catalyst. The DOC/DPF/SCR or DOC/CSF/SCR arrangement is a preferred exhaust system for a light-duty diesel vehicle. This embodiment also relates to the use of the oxidation catalyst for treating an exhaust gas from a compression ignition engine in combination with either a diesel particulate filter or a catalysed soot filter (CSF), and a selective catalytic reduction (SCR) catalyst, preferably wherein the oxidation catalyst is, or is for use as, a diesel oxidation catalyst. The oxidation catalyst is typically followed by (e.g. is upstream of) the diesel particulate filter or the catalysed soot filter (CSF). The DPF or CSF is typically followed by (e.g. is upstream of) the selective catalytic reduction (SCR) catalyst. A nitrogenous reductant injector may be arranged between the DPF or CSF and the selective catalytic reduction (SCR) catalyst. Thus, the DPF or CSF may be followed by (e.g. is upstream of) a nitrogenous reductant injector, and the nitrogenous reductant injector may be followed by (e.g. is upstream of) the selective catalytic reduction (SCR) catalyst.

A sixth exhaust system embodiment relates to an exhaust system comprising a diesel oxidation catalyst (DOC), the oxidation catalyst of the invention, preferably as a catalysed soot filter (CSF), and a selective catalytic reduction (SCR) catalyst. This is also a DOC/CSF/SCR arrangement. A further aspect of this embodiment relates to the use of the oxidation catalyst for treating an exhaust gas from a compression ignition engine in combination with a diesel oxidation catalyst (DOC) and a selective catalytic reduction (SCR) catalyst, preferably wherein the oxidation catalyst is, or is for use as, a catalysed soot filter (CSF). The diesel oxidation catalyst (DOC) is typically followed by (e.g. is upstream of) the oxidation catalyst of the invention. The oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst.

In a seventh exhaust system embodiment, the exhaust system comprises the oxidation catalyst of the invention, preferably as a DOC, a selective catalytic reduction (SCR) catalyst and either a catalysed soot filter (CSF) or a diesel particulate filter (DPF). This embodiment also relates to the use of the oxidation catalyst for treating an exhaust gas from a compression ignition engine in combination with a selective catalytic reduction (SCR) catalyst and either a catalysed soot filter (CSF) or a diesel particulate filter (DPF), preferably wherein the oxidation catalyst is, or is for use as, a diesel oxidation catalyst.

In the seventh exhaust system embodiment, the oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

In any of the first, second or fifth to seventh exhaust system embodiments described hereinabove containing a SCR catalyst (including SCRF™ catalyst), an ASC catalyst can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

Generally, it is preferred that the exhaust system of the invention does not comprise a lean $NO_x$ trap (LNT) (sometimes referred to as a $NO_x$ adsorber catalyst (NAC), a De $NO_x$ trap (DNT) catalyst, a $NO_x$ storage catalyst, or a $NO_x$ storage/reduction (NSR) catalyst).

The invention further provides a vehicle comprising a compression ignition engine and either an exhaust system of the invention or an oxidation catalyst of the invention. Generally, the compression ignition engine is a diesel engine. The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

Generally, the oxidation catalyst may be used in combination with an emissions control device. Typically, the oxidation catalyst is used in combination with:

(i) a selective catalytic reduction (SCR) catalyst, preferably a SCR catalyst downstream of the oxidation catalyst, particularly when the oxidation catalyst is or is used as a diesel oxidation catalyst (DOC);
(ii) a selective catalytic reduction filter (SCRF™) catalyst, preferably a SCRF™ catalyst downstream of the oxidation catalyst, particularly when the oxidation catalyst is or is used as a diesel oxidation catalyst (DOC);
(iii) a diesel particulate filter (DPF) or a catalysed soot filter (CSF), preferably a DPF or CSF downstream of the oxidation catalyst, particularly when the oxidation catalyst is or is used as a diesel oxidation catalyst (DOC);
(iv) a diesel oxidation catalyst (DOC), preferably a DOC upstream of the oxidation catalyst of the invention, particularly when the oxidation catalyst is or is used as a catalysed soot filter (CSF);
(v) a diesel particulate filter (DPF) or a catalysed soot filter (CSF) and a selective catalytic reduction (SCR) catalyst, preferably a DPF or CSF downstream of the oxidation catalyst and an SCR catalyst downstream of the DPF or CSF, particularly when the oxidation catalyst is or is used as a diesel oxidation catalyst (DOC);
(vi) a diesel oxidation catalyst (DOC) and a selective catalytic reduction (SCR) catalyst, preferably a DOC upstream of the oxidation catalyst of the invention and a SCR catalyst downstream of the oxidation catalyst of the invention, particularly when the oxidation catalyst is or is used as a catalysed soot filter (CSF); or
(vii) a selective catalytic reduction (SCR) catalyst and either a diesel particulate filter (DPF) or a catalysed soot filter (CSF), preferably a SCR catalyst downstream of the oxidation catalyst and a DPF or CSF downstream of the SCR catalyst, particularly when the oxidation catalyst is or is used as a diesel oxidation catalyst (DOC).

The oxidation catalyst of the invention can be used to modulate the content of $NO_x$ in an exhaust gas from a compression ignition engine, such as for a downstream emissions control device.

Any reference to "modulate the $NO_x$ content" as used herein, particularly in relation to method or use aspects of the invention, refers to changing (i.e. adjusting) or maintaining the ratio (in ppm or % volume, typically at the temperature and pressure of the exhaust gas) of $NO:NO_2$ to be within a predefined range at a specific exhaust gas temperature or temperature range.

In general, "modulate the $NO_x$ content" refers to changing or maintaining, preferably changing, the ratio (in ppm or % volume) of $NO:NO_2$ in an exhaust gas, typically directly from the compression ignition engine, to be less than 17:3 (i.e. the amount of NO to $NO_2$ is less than that which is normally found in an exhaust gas from a compression ignition engine), preferably the ratio of $NO:NO_2$ is from 5:1 to 1:5, more preferably 2.5:1 to 1:2.5, and even more preferably 2:1 to 1:2 (e.g. 1.5:1 to 1:1.5 or about 1:1). The ratio of $NO:NO_2$ when the temperature is at the first temperature range (i.e. the temperature at which $NO_x$ is stored or absorbed) may be lower than the ratio at the second temperature range (i.e. the temperature at which $NO_x$ is released).

Generally, in the second method aspect of the invention, the step of (b) passing the treated exhaust gas to an emissions control device typically involves directly passing the treated exhaust gas to the emissions control device. Thus, an outlet of the oxidation catalyst is directly connected (e.g. without intermediary) to an inlet of the emissions control device.

The emissions control device is typically a selective catalytic reduction (SCR) catalyst, a selective catalytic reduction filter (SCRF™) catalyst, a diesel particulate filter (DPF), or a catalysed soot filter (CSF).

In the third use aspect of the invention, the oxidation catalyst is used in the regeneration of an emissions control device having a filtering substrate. It may be used in the active or passive regeneration of the emissions control device, preferably the active regeneration. Typically, the emissions control device having a filtering substrate is downstream of the oxidation catalyst.

The emissions control device having a filtering substrate may be selected from the group consisting of a diesel particulate filter (DPF), a catalysed soot filter (CSF), a selective catalytic reduction filter (SCRF™) catalyst and a combination of two or more thereof.

The oxidation catalyst may be used to regenerate the emissions control device having a filtering substrate by oxidising nitric oxide (NO) to nitrogen dioxide ($NO_2$) at a temperature of at least 220° C., preferably at least 240° C., more preferably at least 260° C., still more preferably at least 280° C.

Definitions

The term "washcoat" is well known in the art and refers to an adherent coating that is applied to a substrate usually during production of a catalyst. The coating or washcoat generally comprises one or more components of a catalyst formulation, which components are typically selected from a platinum group metal, a support material, an oxygen storage component and a hydrocarbon adsorbent.

The term "washcoat region" as used herein refers to an area of washcoat on a substrate. A "washcoat region" can, for example, be disposed or supported on a substrate as a "layer" or a "zone". The area or arrangement of a washcoat on a substrate is generally controlled during the process of applying the washcoat to the substrate. The "washcoat region" typically has distinct boundaries or edges (i.e. it is possible to distinguish one washcoat region from another washcoat region using conventional analytical techniques).

It is preferable that each "washcoat region" has a substantially uniform composition (i.e. there is no substantial difference in the composition of the washcoat when comparing one part of the washcoat region with another part of that washcoat region). Substantially uniform composition in this context refers to a material (e.g. washcoat region) where the difference in composition when comparing one part of the washcoat region with another part of the washcoat region is 5% or less, usually 2.5% or less, and most commonly 1% or less.

The term "washcoat zone" as used herein refers to a washcoat region of substantially uniform length. The length of a washcoat zone may be the same as the total length of the substrate. In general, the length of a washcoat zone is less than the total length of the substrate. The total length of a substrate is the distance between its inlet end and its outlet end (e.g. the opposing ends of the substrate). A "washcoat zone" typically has a length (i.e. a substantially uniform length) of at least 5% of the total length of the substrate.

Any reference to a "substantially uniform" in the context of a length or to "substantially uniform length" as used herein refers to a length that does not deviate by more than 10%, preferably does not deviate by more than 5%, more preferably does not deviate by more than 1%, from its mean value.

Any reference to a "washcoat zone disposed at an inlet end of the substrate" used herein refers to a washcoat zone disposed or supported on a substrate that is nearer to an inlet end of the substrate than it is to an outlet end of the substrate. Thus, the midpoint of the washcoat zone (i.e. at half its length) is nearer to the inlet end of the substrate than the midpoint is to the outlet end of the substrate. Similarly, any reference to a "washcoat zone disposed at an outlet end of the substrate" used herein refers to a washcoat zone disposed or supported on a substrate that is nearer to an outlet end of the substrate than it is to an inlet end of the substrate. Thus, the midpoint washcoat zone (i.e. at half its length) is nearer to the outlet end of the substrate than the midpoint is to the inlet end of the substrate.

When the substrate is a wall-flow filter, then generally any reference to a "washcoat zone disposed at an inlet end of the substrate" refers to a washcoat zone disposed or supported on the substrate that is (a) nearer to an inlet end of an inlet channel of the substrate than it is to a closed end of the inlet channel, and/or (b) nearer to a closed end of an outlet channel of the substrate than it is to an outlet end of the outlet channel. Thus, the midpoint of the washcoat zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel. Similarly, any reference to a "washcoat zone disposed at an outlet end of the substrate" when the substrate is a wall-flow filter refers to a washcoat zone disposed or supported on the substrate that is (a) nearer to an outlet end of an outlet channel of the substrate than it is to a closed end of the outlet channel, and/or (b) nearer to a closed end of an inlet channel of the substrate than it is to an inlet end of the inlet channel. Thus, the midpoint of the washcoat zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The alumina or a mixed or composite oxide comprising alumina is not a modified alumina incorporating a heteroatom component, particularly a modified alumina incorporating a heteroatom component that comprises, or consists essentially of, an alumina doped with a heteroatom component or an alkaline earth metal aluminate. In this context, the heteroatom component comprises silicon, magnesium, barium, lanthanum, cerium, titanium, or zirconium or a combination of two or more thereof.

For the avoidance of doubt, the term "modified alumina incorporating a heteroatom component" does not embrace "pure" alumina (i.e. alumina having a purity of ≥99.9%) or a mixture of alumina and the heteroatom component, such as a mixture of silica and alumina. In the context of the "modified alumina incorporating a heteroatom component", any amount in % by weight refers to the amount of heteroatom component, whether an element, ion or a compound, that is present in the host lattice of alumina with the remainder consisting essentially of alumina.

The term "alumina doped with a heteroatom component" generally refers to a material comprising a host lattice of alumina that is substitution doped or interstitially doped with a heteroatom component. In some instances, small amounts of the heteroatom component may be present (i.e. as a dopant) at a surface of the alumina. However, most of the dopant will generally be present in the body of the host lattice of the alumina. Alumina doped with a heteroatom component is generally commercially available, or can be prepared by conventional methods that are well known in the art or by using a method as described in U.S. Pat. No. 5,045,519.

The term "alkaline earth metal component" as used herein generally refers to an element or ion from Group 2 of the Periodic Table, a compound comprising an element or ion from Group 2 of the Periodic Table, or a metal alloy comprising an element from Group 2 of the Periodic Table, unless otherwise specified. The term "alkaline earth metal component" typically does not comprise or include the "modified alumina incorporating a heteroatom component". The "alkaline earth metal component" is not an "alumina doped with a heteroatom component" or an "alkaline earth metal aluminate" as described herein.

Generally, the "alkaline earth metal component" is (i) a compound comprising an alkaline earth metal, and/or (ii) a metal alloy comprising an alkaline earth metal. In the compound comprising an alkaline earth metal, the alkaline earth metal is typically present as a cation. The compound may, for example, be an alkaline earth metal oxide, an alkaline earth metal nitrate, an alkaline earth metal carbonate, or an alkaline earth metal hydroxide. In the metal alloy, the alkaline earth metal is typically present in elemental form (i.e. as a metal). The alkaline earth metal component is preferably a compound comprising an alkaline earth metal, more preferably a compound comprising a single alkaline earth metal.

The term "platinum group metal (PGM)" as used herein generally refers to the metals Ru, Rh, Pd, Os, Ir and Pt of the Periodic Table, particularly the metals Ru, Rh, Pd, Ir and Pt.

In the context of platinum (Pt) or palladium (Pd), it is to be appreciated that it is often difficult to characterise the exact catalytic species in a catalyst and the platinum or palladium may not be present in elemental, metallic form. Any reference to "consisting essentially of platinum . . . " embraces a "platinum component" where the platinum moiety can be an elemental form of platinum, an alloy containing platinum or a compound comprising platinum (e.g. an oxide of platinum), preferably an elemental form of platinum or an alloy containing platinum, more preferably an elemental form of platinum. Similarly, any reference to "consisting essentially of palladium . . . " embraces a "palladium component" where the palladium moiety can be an elemental form of palladium, an alloy containing palladium or a compound comprising palladium (e.g. an oxide of palladium), preferably an elemental form of palladium or an alloy containing palladium, more preferably an elemental form of palladium.

The term "substantially free" as used herein in the context of a particular chemical entity refers to a composition or material that contains less than 0.5% by weight of the chemical entity, typically less than 0.1% by weight of the chemical entity, such as less than 0.01% by weight of the chemical entity. Generally, the chemical entity is not detectable using conventional analytical techniques.

Any reference to washcoat zones that do not "substantially overlap" as used herein refers an overlap (i.e. between the ends of neighbouring zones on a substrate) of less than 10% of the length of the substrate, preferably less than 7.5% of the length of the substrate, more preferably less than 5% of the length of the substrate, particularly less than 2.5% of the length of the substrate, even more preferably less than 1% of the length of the substrate, and most preferably there is no overlap.

EXAMPLES

The invention will now be illustrated by the following non-limiting examples.

A cordierite flow through monolith having 400 cells per square inch was used in each of the examples below and it was coated with a washcoat using conventional techniques.

Example 1

Silica doped alumina powder was slurried in water and milled to a particle size having $d_{90}$<20 micron. Barium acetate was added to the slurry followed by soluble platinum and palladium salts. Beta zeolite was then added, such that the slurry comprised 70% silica doped alumina and 30% zeolite by mass. The slurry was then stirred to homogenise. The resulting washcoat was applied to a monolith and was dried and then calcined at 500° C. A second washcoat was then prepared. Alumina powder was slurried in water and milled to a particle size having $d_{90}$<20 micron. A soluble platinum salt was added to the slurry and it was stirred to homogenise. This second slurry was coated on to the monolith and was dried and then calcined at 500° C. The resulting oxidation catalyst had a total PGM loading of 55 g ft$^{-3}$ with 67% of the total Pt present in the uppermost second layer.

Comparative Example 1

Silica doped alumina powder was slurried in water and milled to a particle size having $d_{90}$<20 micron. Barium acetate was added to the slurry followed by soluble platinum and palladium salts. Beta zeolite was then added, such that the slurry comprised 85% silica doped alumina and 15% zeolite by mass. The slurry was then stirred to homogenise. The resulting washcoat was applied to a monolith and was dried and then calcined at 500° C. A second washcoat was then prepared. Alumina powder was slurried in water and milled to a particle size having $d_{90}$<20 micron. A soluble platinum salt was added to the slurry followed by beta zeolite, such that the slurry comprised 70% alumina and 30% zeolite by mass. The slurry was stirred to homogenise. This second slurry was coated on to the monolith and was dried and then calcined at 500° C. The resulting oxidation catalyst had a total PGM loading of 55 g ft$^{-3}$ with 67% of the total Pt present in the uppermost second layer.

Example 2

Alumina powder was slurried in water and milled to a particle size having $d_{90}$<20 micron. Beta zeolite was added to the slurry, such that it comprised 62.5% zeolite and 37.5% alumina by mass. The resulting washcoat was applied to a monolith and was dried and then calcined at 500° C. A second washcoat was then prepared. Silica doped alumina powder was slurried in water and milled to a particle size having $d_{90}$<20 micron. Barium acetate was added to the slurry followed by soluble platinum and palladium salts. The slurry was then stirred to homogenise. The resulting washcoat was applied to the monolith and was dried and then calcined at 500° C. A third washcoat was then prepared. Alumina powder was slurried in water and milled to a particle size having $d_{90}$<20 micron. A soluble platinum salt was added to the slurry, which was stirred to homogenise. This third slurry was coated on to the monolith and was dried and then calcined at 500° C. The resulting oxidation catalyst had a total PGM loading of 53.5 g ft$^{-3}$ with 70% of the total Pt present in the uppermost third layer.

Comparative Example 2

Silica doped alumina powder was slurried in water and milled to a particle size having $d_{90}$<20 micron. Barium acetate was added to the slurry followed by soluble platinum and palladium salts. The slurry was then stirred to homogenise. The resulting washcoat was applied to the monolith and was dried and then calcined at 500° C. A second washcoat was then prepared. Alumina powder was slurried in water and milled to a particle size having $d_{90}$<20 micron. Soluble platinum salt was added to the slurry and it was stirred to homogenise. This second slurry was coated on to the monolith and was dried and then calcined at 500° C. A third washcoat was then prepared. Alumina powder was slurried in water and milled to a particle size having $d_{90}$<20 micron. Beta zeolite was added to the slurry, such that it comprised 62.5% zeolite and 37.5% alumina by mass. The resulting washcoat was applied to the monolith to form a third layer, and was dried and then calcined at 500° C. The resulting oxidation catalyst had a total PGM loading of 53.5 g ft$^{-3}$ with 70% of the total Pt present in the middle second layer.

Example 3

Silica doped alumina powder was slurried in water and milled to a particle size having $d_{90}$<20 micron. Barium acetate was added to the slurry followed by soluble platinum and palladium salts. Beta zeolite was added to the slurry, such that it comprised 70% silica doped alumina and 30% zeolite by mass. The slurry was then stirred to homogenise. The resulting washcoat was applied to a monolith and was dried and then calcined at 500° C. A second washcoat was then prepared. Alumina powder was slurried in water and milled to a particle size having $d_{90}$<20 micron. A soluble platinum salt was added to the slurry and it was stirred to homogenise. This second slurry was coated on to the monolith to form a second layer, and was dried and then calcined at 500° C. The resulting oxidation catalyst had a total PGM loading of 54.5 g ft$^{-3}$ with 75% of the total Pt present in the uppermost second layer.

Comparative Example 3

Alumina powder was slurried in water and milled to a particle size having $d_{90}$<20 micron. A soluble platinum salt was added to the slurry and it was stirred to homogenise. The resulting washcoat was applied to a monolith and was dried and then calcined at 500° C. A second washcoat was then prepared. Silica doped alumina powder was slurried in water and milled to a particle size having $d_{90}$<20 micron. Barium acetate was added to the slurry followed by soluble platinum and palladium salts. Beta zeolite was added to the slurry, such that it comprised 70% silica doped alumina and 30% zeolite by mass. The slurry was then stirred to homogenise. This second slurry was coated on to the monolith to form a second layer, and was then dried and calcined at 500° C. The resulting oxidation catalyst had a total PGM loading of 54.5 g ft$^{-3}$ with 75% of the total Pt present in the first layer in contact with the substrate.

Measurement of NO Oxidation

The catalytic activity of each oxidation catalyst was measured using a synthetic gas bench activity test (SCAT). A sample of each catalyst to be tested was obtained by removing a coated core from the monolith using a core drill. Each core was aged in an oven at 800° C. for 16 hours using hydrothermal conditions (10% water). The aged cores were tested in a simulated catalyst activity testing (SCAT) gas apparatus using the inlet gas mixture in Table 1. In each case the balance is nitrogen.

TABLE 1

| | |
|---|---|
| CO | 1500 ppm |
| HC (as $C_1$) | 430 ppm |
| NO | 100 ppm |
| $CO_2$ | 4% |
| $H_2O$ | 4% |
| $O_2$ | 14% |
| Space velocity | 55000/hour |

Results

The result for each example is shown in Table 2 below.

TABLE 2

| | NO oxidation at 300° C. (%) |
|---|---|
| Example 1 | 61 |
| Comparative Example 1 | 54 |
| Example 2 | 51 |
| Comparative Example 2 | 34 |
| Example 3 | 59 |
| Comparative Example 3 | 38 |

In the oxidation catalyst of Example 1, the top, uppermost washcoat layer is free of zeolite. The zeolite is present in the bottom washcoat layer that is in direct contact with the substrate. The oxidation catalyst of Comparative Example 1 has zeolite present in both washcoat layers. The same quantity of zeolite is present in the oxidation catalysts of Example 1 and Comparative Example 1. The result in Table 2 demonstrates that the oxidation catalyst of Example 1 shows better activity toward oxidising NO to $NO_2$ than Comparative Example 1. This can be beneficial for the fast SCR reaction in a downstream emissions control device, such as an SCR or SCRF catalyst.

In Example 2 the top, uppermost washcoat layer is free of zeolite. The zeolite is present in the bottom washcoat layer that is in direct contact with the substrate. In contrast, the oxidation catalyst of Comparative Example 2 has a zeolite in the top, uppermost washcoat layer. The result in Table 2 demonstrates that the oxidation catalyst of Example 2 has superior activity for oxidising NO to $NO_2$ than Comparative Example 2.

The oxidation catalyst of Example 3 has a top, uppermost washcoat layer that is free of zeolite. The zeolite is present in the bottom washcoat layer that is in direct contact with the substrate. The oxidation catalyst of Comparative Example 3 is the reverse layered arrangement of Example 3. It has a top, uppermost washcoat that contains zeolite and the bottom washcoat layer is free of zeolite. The results in Table 2 show that the catalyst of Example 3 has superior activity for oxidising NO to $NO_2$ than Comparative Example 3.

For the avoidance of any doubt, the entire content of any and all documents cited herein is incorporated by reference into the present application.

The invention claimed is:

1. An exhaust system for a compression ignition engine comprising an oxidation catalyst for treating an exhaust gas from a compression ignition engine, which oxidation catalyst comprises:
   a first washcoat region comprising platinum (Pt) and a first support material, wherein the first washcoat region is substantially free of a hydrocarbon adsorbent, which is a zeolite, and either (a) the platinum (Pt) is the only platinum group metal (PGM) in the first washcoat region, or (b) the first washcoat region further comprises palladium (Pd), and the first washcoat region has a ratio by mass of platinum (Pt) to palladium (Pd) of >4:1; and wherein the first washcoat region does not comprise a rare earth metal;
   a second washcoat region comprising platinum (Pt), palladium (Pd), a second support material and a hydrocarbon adsorbent, which is a zeolite, wherein the second washcoat region has a ratio by mass of platinum (Pt) to palladium (Pd) of 4:1 to 1.1:1, and wherein the second washcoat region does not comprise a rare earth metal; and
   a substrate;
   wherein the first washcoat region is arranged to contact inlet exhaust gas before the zeolite and the first washcoat region is a first washcoat zone disposed at the inlet end of the substrate, and the second washcoat region is a second washcoat zone disposed downstream of the first washcoat zone such that the first washcoat region is arranged to contact inlet exhaust gas before the second washcoat region.

2. An exhaust system according to claim 1, wherein the first washcoat region further comprises palladium (Pd), and the first washcoat region has a ratio by mass of platinum (Pt) to palladium (Pd) of 15:1 to 4.5:1.

3. An exhaust system according to claim 1, wherein the first support material comprises a refractory metal oxide, wherein the refractory metal oxide is selected from the group consisting of alumina, silica, titania, zirconia and mixed or composite oxides of two or more thereof.

4. An exhaust system according to claim 3, wherein the refractory metal oxide is selected from alumina and silica-alumina.

5. An exhaust system according to claim 1 further comprising an emissions control device.

6. An exhaust system according to claim 5, wherein the emissions control device is a selective catalytic reduction (SCR) catalyst, a selective catalytic reduction filter catalyst, a diesel particulate filter (DPF), or a catalysed soot filter (CSF).

7. A vehicle comprising a compression ignition engine and an exhaust system according to claim 1.

8. An exhaust system according to claim 1, wherein the first washcoat region comprises a promoter, which is an alkaline earth metal component.

9. An exhaust system according to claim 1, wherein the second washcoat region comprises a promoter, which is an alkaline earth metal component.

10. An exhaust system according to claim 1, wherein the first washcoat zone adjoins the second washcoat zone.

11. An exhaust system according to claim 1, wherein the first washcoat zone overlaps the second washcoat zone.

12. An exhaust system according to claim 1, wherein the second washcoat zone overlaps the first washcoat zone.

13. An exhaust system according to claim 1, wherein the first washcoat region is substantially free of rhodium (Rh).

14. An exhaust system according to claim 1, wherein the second washcoat region is substantially free of rhodium (Rh).

15. An exhaust system according to claim 1, wherein the substrate is a monolith, which is a flow-through monolith or a filtering monolith.

16. An exhaust system according to claim 15, wherein the substrate is a filtering monolith, which is a wall-flow filter.

17. An exhaust system for a compression ignition engine comprising an oxidation catalyst for treating an exhaust gas from a compression ignition engine, which oxidation catalyst comprises a substrate and only two washcoat regions, which are a first washcoat region and a second washcoat region, wherein:
   the first washcoat region comprises platinum (Pt) and a first support material, wherein the first washcoat region is substantially free of a hydrocarbon adsorbent, which is a zeolite, and either (a) the platinum (Pt) is the only platinum group metal (PGM) in the first washcoat region, or (b) the first washcoat region further comprises palladium (Pd), and the first washcoat region has a ratio by mass of platinum (Pt) to palladium (Pd) of >4:1; and wherein the first washcoat region does not comprise a rare earth metal;
   the second washcoat region comprises platinum (Pt), palladium (Pd), a second support material and a hydrocarbon adsorbent, which is a zeolite, wherein the second washcoat region has a ratio by mass of platinum (Pt) to palladium (Pd) of 4:1 to 1.1:1, and wherein the second washcoat region does not comprise a rare earth metal; and
   wherein the first washcoat region is arranged to contact inlet exhaust gas before the zeolite and the first washcoat region is a first washcoat zone disposed at the inlet end of the substrate, and the second washcoat region is a second washcoat zone disposed downstream of the first washcoat zone, such that the first washcoat region is arranged to contact inlet exhaust gas before the second washcoat region.

18. An exhaust system according to claim 17, wherein the first washcoat region further comprises palladium (Pd), and the first washcoat region has a ratio by mass of platinum (Pt) to palladium (Pd) of 15:1 to 4.5:1.

19. An exhaust system according to claim 17, wherein the first support material comprises a refractory metal oxide, wherein the refractory metal oxide is selected from the group consisting of alumina, silica, titania, zirconia and mixed or composite oxides of two or more thereof.

20. An exhaust system according to claim 19, wherein the refractory metal oxide is selected from alumina and silica-alumina.

21. An exhaust system according to claim 17 further comprising an emissions control device.

22. An exhaust system according to claim 21, wherein the emissions control device is a selective catalytic reduction (SCR) catalyst, a selective catalytic reduction filter catalyst, a diesel particulate filter (DPF), or a catalysed soot filter (CSF).

23. An exhaust system according to claim 17, wherein the first washcoat region comprises a promoter, which is an alkaline earth metal component.

24. An exhaust system according to claim 17, wherein the second washcoat region comprises a promoter, which is an alkaline earth metal component.

25. An exhaust system according to claim 17, wherein the first washcoat zone adjoins the second washcoat zone.

26. An exhaust system according to claim 17, wherein the first washcoat zone overlaps the second washcoat zone.

27. An exhaust system according to claim 17, wherein the second washcoat zone overlaps the first washcoat zone.

28. An exhaust system according to claim 17, wherein the first washcoat region is substantially free of rhodium (Rh).

29. An exhaust system according to claim 17, wherein the second washcoat region is substantially free of rhodium (Rh).

30. An exhaust system according to claim 17, wherein the substrate is a monolith, which is a flow-through monolith or a filtering monolith.

31. An exhaust system according to claim 30, wherein the substrate is a filtering monolith, which is a wall-flow filter.

32. An exhaust system for a compression ignition engine comprising an oxidation catalyst for treating an exhaust gas from a compression ignition engine, which oxidation catalyst comprises:
- a first washcoat region comprising platinum (Pt) and a first support material, wherein the first washcoat region is substantially free of a hydrocarbon adsorbent, which is a zeolite, and either (a) the platinum (Pt) is the only platinum group metal (PGM) in the first washcoat region, or (b) the first washcoat region further comprises palladium (Pd), and the first washcoat region has a ratio by mass of platinum (Pt) to palladium (Pd) of >4:1; and wherein the first washcoat region does not comprise a rare earth metal;
- a second washcoat region comprising platinum (Pt), palladium (Pd), a second support material and a hydrocarbon adsorbent, which is a zeolite, wherein the second washcoat region has a ratio by mass of platinum (Pt) to palladium (Pd) of 4:1 to 1.1:1, and wherein the second washcoat region does not comprise a rare earth metal;
- a third washcoat region comprising a hydrocarbon adsorbent, which is a zeolite; and
- a substrate;
- wherein the first washcoat region is arranged to contact inlet exhaust gas before the zeolite and the first washcoat region is a first washcoat zone disposed at the inlet end of the substrate, and the second washcoat region is a second washcoat zone disposed downstream of the first washcoat zone, such that the first washcoat region is arranged to contact inlet exhaust gas before the second washcoat region; and
- wherein the third washcoat region is a third washcoat layer, which is disposed directly onto the substrate, and wherein the first washcoat zone and the second washcoat zone are disposed on the third washcoat layer.

\* \* \* \* \*